US012093198B2

(12) United States Patent
Mao et al.

(10) Patent No.: US 12,093,198 B2
(45) Date of Patent: Sep. 17, 2024

(54) PROCESSOR FOR A CRYPTOSYSTEM

(71) Applicant: City University of Hong Kong, Hong Kong (HK)

(72) Inventors: Gaoyu Mao, Hong Kong (HK); Guangyan Li, Hong Kong (HK); Chak Chung Cheung, Hong Kong (HK); Alan Hiu Fung Lam, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 17/962,557

(22) Filed: Oct. 10, 2022

(65) Prior Publication Data

US 2024/0143524 A1 May 2, 2024

(51) Int. Cl.
*G06F 13/28* (2006.01)
*G06F 13/42* (2006.01)

(52) U.S. Cl.
CPC .......... *G06F 13/28* (2013.01); *G06F 13/4234* (2013.01)

(58) Field of Classification Search
None
See application file for complete search history.

(56) References Cited

U.S. PATENT DOCUMENTS

| | | | | |
|---|---|---|---|---|
| 6,766,341 B1* | 7/2004 | Trelewicz | ............... | G06F 17/14 708/402 |
| 9,177,104 B2* | 11/2015 | Madabhushi | ...... | G01R 33/5608 |
| 10,761,938 B2* | 9/2020 | Pillilli | ................. | G06F 11/1441 |
| 11,265,163 B2 | 3/2022 | Poeppelmann | | |
| 11,496,297 B1* | 11/2022 | Beckwith | .............. | H04L 9/3093 |
| 2002/0028021 A1* | 3/2002 | Foote | ..................... | G06V 20/48 382/224 |
| 2004/0122882 A1* | 6/2004 | Zakharov | ................ | G06F 17/12 708/446 |
| 2014/0294272 A1* | 10/2014 | Madabhushi | ........ | G06V 20/695 382/131 |
| 2018/0095832 A1* | 4/2018 | Pillilli | ................... | G06F 9/4403 |
| 2018/0204111 A1* | 7/2018 | Zadeh | ................. | G06V 10/764 |
| 2020/0184278 A1* | 6/2020 | Zadeh | .................... | G06N 3/044 |

(Continued)

OTHER PUBLICATIONS

M. Ajtai. 1996. Generating Hard Instances of Lattice Problems (Extended Abstract). In Proceedings of the Twenty-Eighth Annual ACM Symposium on Theory of Computing (Philadelphia, Pennsylvania, USA) (STOC '96). Association for Computing Machinery, New York, NY, USA, 99-108.

(Continued)

*Primary Examiner* — Henry Tsai
*Assistant Examiner* — Christopher A Bartels
(74) *Attorney, Agent, or Firm* — IDEA Intellectual Limited; Margaret A. Burke; Sam T. Yip

(57) ABSTRACT

A processor for a cryptosystem. The processor comprises a hybrid processor architecture including a hardware processor, a software processor and an interconnection interface arranged to exchange data between the hardware processor and the software processor; wherein the hardware processor comprises a plurality of hardware accelerator modules arranged to perform computational tasks including at least one of number theoretic transforms (NTT) computation, arithmetic operations which are more time-consuming when being performed instead by the software-processor.

17 Claims, 7 Drawing Sheets

(56) References Cited

U.S. PATENT DOCUMENTS

| | | | |
|---|---|---|---|
| 2020/0265167 A1 | 8/2020 | Banerjee et al. | |
| 2020/0320159 A1* | 10/2020 | Matthews | C09K 5/10 |
| 2021/0357742 A1* | 11/2021 | Restuccia | G06N 3/063 |
| 2022/0121884 A1* | 4/2022 | Zadeh | G06V 10/764 |
| 2023/0385985 A1* | 11/2023 | Kothandaraman | G06T 3/4084 |

OTHER PUBLICATIONS

Utsav Banerjee, Tenzin S. Ukyab, and Anantha P. Chandrakasan. 2019. Sapphire: A Configurable Crypto-Processor for Post-Quantum Lattice-based Protocols. IACR Transactions on Cryptographic Hardware and Embedded Systems 2019, 4 (Aug. 2019), 17-61.

Luke Beckwith, Duc Tri Nguyen, and Kris Gaj. 2021. High-Performance Hardware Implementation of Crystals-Dilithium. In 2021 International Conference on Field-Programmable Technology (ICFPT). 1-10.

Daniel J Bernstein and Tanja Lange. 2017. Post-quantum cryptography. Nature 549, 7671 (2017), 188-194.

James W. Cooley and John W. Tukey. 1965. An algorithm for the machine calculation of complex Fourier series. Math. Comp. 19 (1965), 297-301.

Viet Ba Dang, Farnoud Farahmand, Michal Andrzejczak, Kamyar Mohajerani, Duc Tri Nguyen, and Kris Gaj. 2020. Implementation and Benchmarking of Round 2 Candidates in the NIST Post-Quantum Cryptography Standardization Process Using Hardware and Software/Hardware Co-design Approaches. IACR Cryptol. ePrint Arch. 2020 (2020), 795.

W. M. Gentleman and G. Sande. 1966. Fast Fourier Transforms: For Fun and Profit. In Proceedings of the Nov. 7-10, 1966, Fall Joint Computer Conference (San Francisco, California) (AFIPS '66 (Fall)). Association for Computing Machinery, New York, NY, USA, 563-578.

Denisa O. C. Greconici, Matthias J. Kannwischer, and Daan Sprenkels. 2020. Compact Dilithium Implementations on Cortex-M3 and Cortex-M4. IACR Transactions on Cryptographic Hardware and Embedded Systems 2021, 1 (Dec. 2020), 1-24.

Georg Land, Pascal Sasdrich, and Tim Güneysu. 2022. A Hard Crystal—Implementing Dilithium on Reconfigurable Hardware. In Smart Card Research and Advanced Applications, Vincent Grosso and Thomas Pöppelmann (Eds.). Springer International Publishing, Cham, 210-230.

Adeline Langlois and Damien Stehlé. 2015. Worst-case to average-case reductions for module lattices. Designs, Codes and Cryptography 75, 3 (2015), 565-599.

Vadim Lyubashevsky. 2009. Fiat-Shamir with Aborts: Applications to Lattice and Factoring-Based Signatures. In Advances in Cryptology—ASIACrypt 2009, Mitsuru Matsui (Ed.). Springer Berlin Heidelberg, Berlin, Heidelberg, 598-616.

V Lyubashevsky, L Ducas, E Kiltz, T Lepoint, P Schwabe, G Seiler, D Stehle, and S Bai. 2020. Crystals-Dilithium—Algorithm Specifications and Supporting Documentation. NIST Post-Quantum Cryptography Standardization Round 3 (2020). https://csrc.nist.gov/Projects/post-quantum-cryptography/post-quantum-cryptography-standardization/round-3-submissions.

Vadim Lyubashevsky, Chris Peikert, and Oded Regev. 2010. On Ideal Lattices and Learning with Errors over Rings. In Advances in Cryptology—EUROCrypt 2010, Henri Gilbert (Ed.). Springer Berlin Heidelberg, Berlin, Heidelberg, 1-23.

National Institute of Standards and Technology (NIST). 2017. Post-Quantum Cryptography. https://csrc.nist.gov/Projects/post-quantum-cryptography.

Hamid Nejatollahi, Felipe Valencia, Subhadeep Banik, Francesco Regazzoni, Rosario Cammarota, and Nikil Dutt. 2020. Synthesis of flexible accelerators for early adoption of ring-lwe post-quantum cryptography. ACM Transactions on Embedded Computing Systems (TECS) 19, 2, Article 11 (Mar. 2020), 17 pages.

OpenCores. 2018. SHA3 (KECCAK). https://opencores.org/projects/sha3.

I. Reed and Treiu-Kien Truong. 1975. The use of finite fields to compute convolutions. IEEE Transactions on Information Theory 21, 2 (1975), 208-213.

Oded Regev. 2005. On Lattices, Learning with Errors, Random Linear Codes, and Cryptography. In Proceedings of the Thirty-Seventh Annual ACM Symposium on Theory of Computing (Baltimore, MD, USA) (STOC '05). Association for Computing Machinery, New York, NY, USA, 84-93.

Sara Ricci, Lukas Malina, Petr Jedlicka, David Smékal, Jan Hajny, Peter Cibik, Petr Dzurenda, and Patrik Dobias. 2021. Implementing CrystalsDilithium Signature Scheme on FPGAs. In The 16th International Conference on Availability, Reliability and Security (Vienna, Austria) (ARES 2021). Association for Computing Machinery, New York, NY, USA, Article 1, 11 pages.

Hwajeong Seo, Pakize Sanal, and Reza Azarderakhsh. 2021. SIKE in 32-Bit ARM Processors Based on Redundant Number System for NIST Level-II. ACM Transactions on Embedded Computing Systems (TECS) 20, 3, Article 19 (May 2021), 23 pages.

P.W. Shor. 1994. Algorithms for quantum computation: discrete logarithms and factoring. In Proceedings 35th Annual Symposium on Foundations of Computer Science. IEEE, 124-134.

Deepraj Soni, Kanad Basu, Mohammed Nabeel, and Ramesh Karri. 2019. A hardware evaluation study of NIST post-quantum cryptographic signature schemes. In Second PQC Standardization Conference. NIST.

Wen Wang, Shanquan Tian, Bernhard Jungk, Nina Bindel, Patrick Longa, and Jakub Szefer. 2020. Parameterized Hardware Accelerators for Lattice-Based Cryptography and Their Application to the HW/SW Co-Design of qTESLA. IACR Transactions on Cryptographic Hardware and Embedded Systems 2020, 3 (Jun. 2020), 269-306.

Neng Zhang, Bohan Yang, Chen Chen, Shouyi Yin, Shaojun Wei, and Leibo Liu. 2020. Highly Efficient Architecture of NewHope-NIST on FPGA using Low-Complexity NTT/INTT. IACR Transactions on Cryptographic Hardware and Embedded Systems 2020, 2 (Mar. 2020), 49-72.

Cankun Zhao, Neng Zhang, Hanning Wang, Bohan Yang, Wenping Zhu, Zhengdong Li, Min Zhu, Shouyi Yin, Shaojun Wei, and Leibo Liu. 2021. A Compact and High-Performance Hardware Architecture for CRYSTALS-Dilithium. IACR Transactions on Cryptographic Hardware and Embedded Systems 2022, 1 (Nov. 2021), 270-295.

Xin Zheng, Chongyao Xu, Xianghong Hu, Yun Zhang, and Xiaoming Xiong. 2020. The Software/Hardware Co-Design and Implementation of SM2/3/4 Encryption/Decryption and Digital Signature System. IEEE Transactions on Computer-Aided Design of Integrated Circuits and Systems 39, 10 (2020), 2055-2066.

Zhen Zhou, Debiao He, Zhe Liu, Min Luo, and Kim-Kwang Raymond Choo. 2021. A Software/Hardware Co-Design of Crystals-Dilithium Signature Scheme. ACM Trans. Reconfigurable Technol. Syst. 14, 2, Article 11 (Jun. 2021), 21 pages.

\* cited by examiner

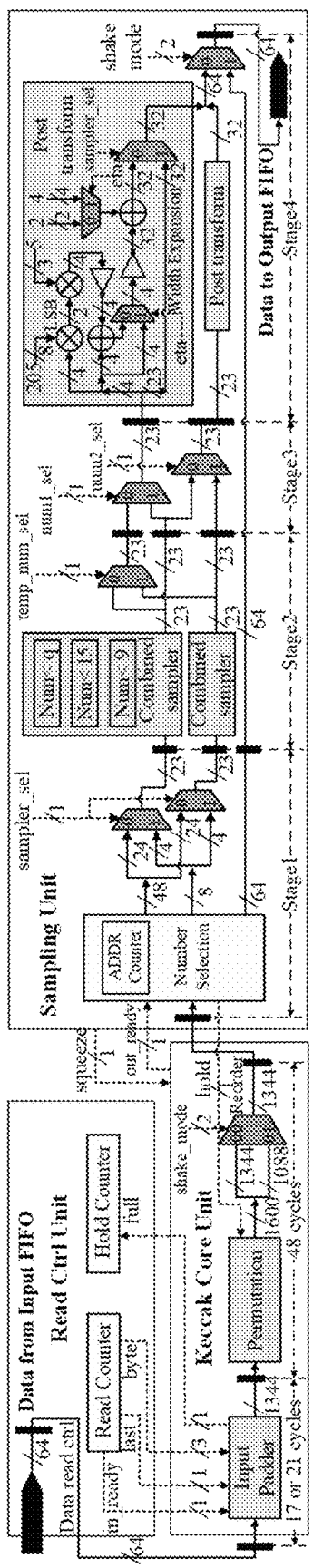
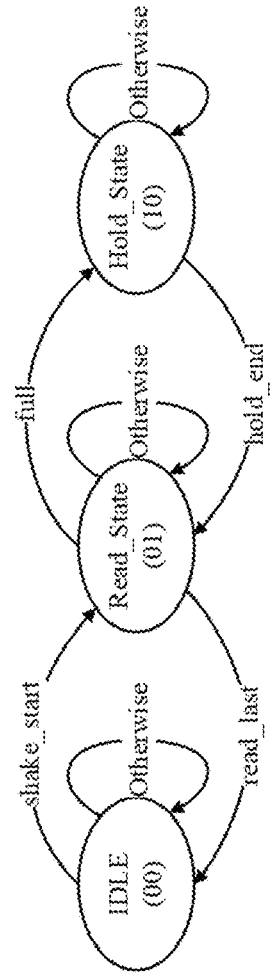
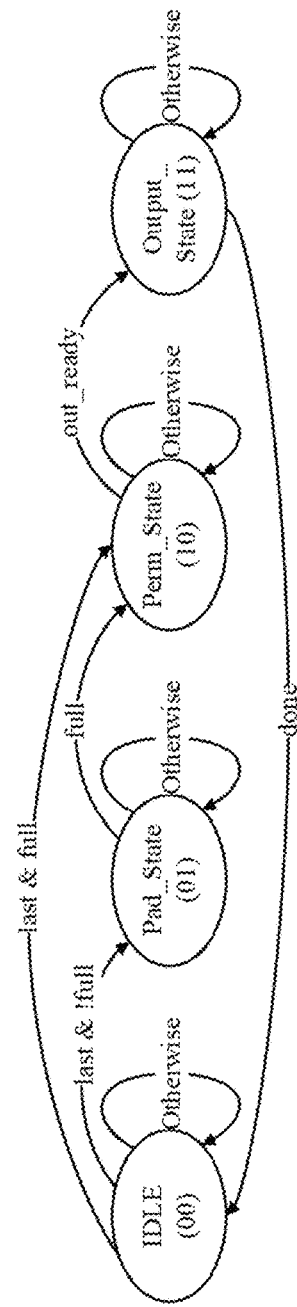
FIG. 6A
FIG. 6B
FIG. 6C

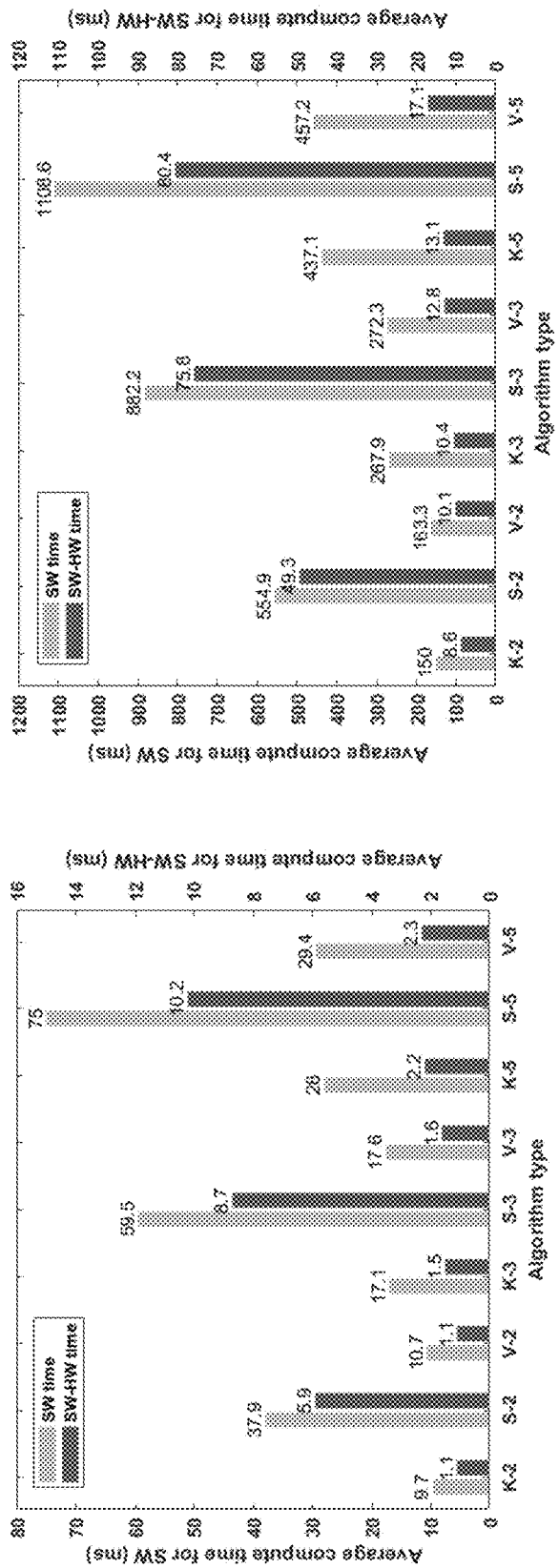
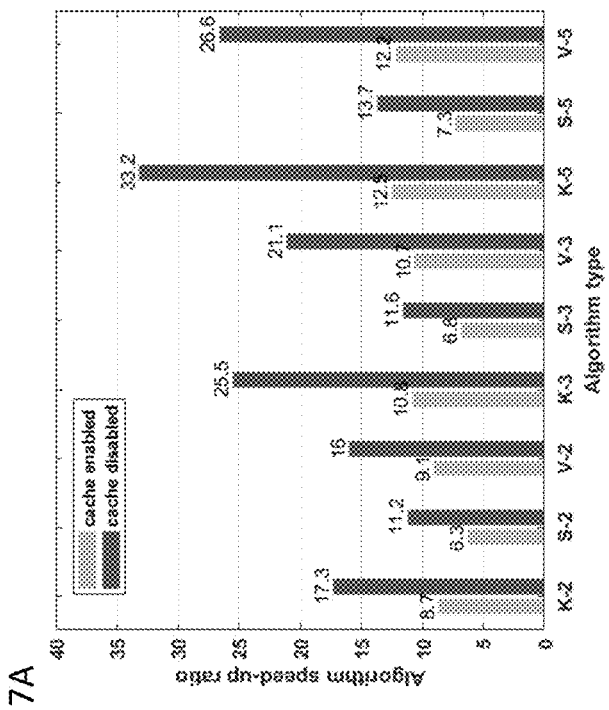
FIG. 7A
FIG. 7B
FIG. 8

PROCESSOR FOR A CRYPTOSYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a processor for a cryptosystem. More specifically the present invention relates to a high-performance and configurable hybrid processor for a cryptosystem.

BACKGROUND OF THE INVENTION

Quantum computers can break widely used public-key cryptography, and finding more secure alternative cryptosystems becomes essential nowadays. CRYSTALS-Dilithium is a lattice-based post-quantum digital signature scheme that may resists attacks by quantum computers, which was selected for final standardization in the NIST Post-Quantum Cryptography (PQC) standardization process. However, such advanced digital signature scheme involves complex and time-consuming computation of data which highly affect the speed performance and design flexibility of the Dilithium-based cryptosystem.

SUMMARY OF THE INVENTION

In accordance with a first aspect of the present invention, there is provided a processor for a cryptosystem, comprising a hybrid processor architecture including a hardware processor, a software processor and an interconnection interface arranged to exchange data between the hardware processor and the software processor; wherein the hardware processor comprises a plurality of hardware accelerator modules arranged to perform computational tasks including at least one of number theoretic transforms (NTT) computation, arithmetic operations which are more time-consuming when being performed instead by the software-processor.

In accordance with the first aspect, the interconnection interface includes a high-performance interface and a general-purpose low performance interface arranged to exchange difference types of data between the hardware processor and the software processor.

In accordance with the first aspect, the interconnection interface includes an AXI memory interconnect and an AXI lite peripheral interconnect operable as the high-performance interface and the general-purpose low performance interface respectively.

In accordance with the first aspect, the AXI memory interconnect is arranged to read and write computation data via a data memory controller of the software processor, and to exchange the computation data with the plurality of hardware accelerator modules of the hardware processor through an AXI protocol.

In accordance with the first aspect, the hardware processor further comprises a DMA intermedium arranged to facilitate exchanging the computation data between the AXI memory interconnect and the plurality of hardware accelerator modules through the AXI protocol.

In accordance with the first aspect, the software processor is arranged to control transfer of computation data and passes configured parameters of the hardware processor through an AXI lite protocol via the AXI peripheral interconnect.

In accordance with the first aspect, the AXI lite peripheral interconnect is arranged to read and write a plurality of control registers associated with the plurality of hardware accelerator modules in the hardware processor through the AXI-Lite protocol.

In accordance with the first aspect, the plurality of hardware accelerator modules includes an NTT transformation module arranged to accelerate multiplication of two polynomials.

In accordance with the first aspect, the NTT transformation module is a hybrid NTT/Inverse-NTT (INTT) transformation module configurable to operate in a selected one of an NTT mode or an INTT mode.

In accordance with the first aspect, the NTT transformation module is arranged to operate according to an NTT finite state transition with following states: receiving two polynomials from an input FIFO of the hardware processor to a first RAM unit in the NTT transformation module in a read state; feeding the two polynomials stored in the first RAM unit into a butterfly unit, and storing computation results obtained by the butterfly unit in a second RAM unit in the NTT transformation module in a calculation state; writing the computation results to the output FIFO of the hardware processor in a write state; and returning the NTT transformation module in an idle state.

In accordance with the first aspect, the NTT transformation module is arranged to resize the input data, the output data and/or the computation results with different bit lengths.

In accordance with the first aspect, the arithmetic operations perform by the hardware processor include polynomial matrix-vector multiplication.

In accordance with the first aspect, the plurality of hardware accelerator modules includes a point-wise multiplication (PWM) module arranged to accelerate point-wise multiplication of two polynomials.

In accordance with the first aspect, the point-wise multiplication module is arranged to operate according to a PWM finite state transition with following states: receiving two polynomials from an input FIFO of the hardware processor to RAM in two multipliers in the PWM module in a read state; completing the point-wise multiplication and modular reduction operations, then writing computation results to the output FIFO of the hardware processor in a multiplication-writing-state; and after carrying out reading, computing, and writing computation data in a pipelined manner, returning the point-wise multiplication module in an idle state.

In accordance with the first aspect, the plurality of hardware accelerator modules includes a point-wise addition (PWA) module arranged to accelerate point-wise addition or subtraction of two polynomials.

In accordance with the first aspect, the point-wise addition module is arranged to operate according to a PWA finite state transition with following states: receiving at least two polynomials from an input FIFO of the hardware processor to RAM in two adders in the PWA module in a read state; completing point-wise addition, then writing computation results to the output FIFO of the hardware processor in an addition-writing-state; and after carrying out reading, computing, and writing computation data in a pipelined manner, returning the point-wise addition module in an idle state; wherein in the addition-writing-state, the point-wise addition module is arranged to perform subtraction by adding a negative representation of one of the two polynomials to another one.

In accordance with the first aspect, the PWA finite state transition further includes an addition state in which more than two sets of polynomials are added by performing point-wise addition before the point-wise addition module entering the addition-writing-state.

In accordance with the first aspect, the plurality of hardware accelerator modules includes a hash module arranged to perform a plurality of operations related to hashing of computation results.

In accordance with the first aspect, the hash module is a SHAKE module arranged to perform SHA-3 related PRNG functions and sampling functions.

In accordance with the first aspect, the cryptosystem is a Dilithium-based cryptosystem.

BRIEF DESCRIPTION OF THE DRAWINGS

Embodiments of the invention are described in more details hereinafter with reference to the drawings, in which:

FIG. 6A is a schematic and data flow diagram illustrating a hardware architecture and pipeline design of the SHAKE module in the hardware processor of the processor of FIG. 1;

FIG. 6B is an input control state diagram of the module control logic associated with an operation of the SHAKE module of FIG. 6A;

FIG. 6C is an output control state diagram of the module control logic associated with an operation of the SHAKE module of FIG. 6A;

FIG. 7A is a plot showing average compute time of Dilithium computed with processor cache enabled;

FIG. 7B is a plot showing average compute time of Dilithium computed with processor cache disabled; and FIG. 8 is a plot showing an effect of Dilithium speedup for hardware acceleration.

DETAILED DESCRIPTION

Figure 1:
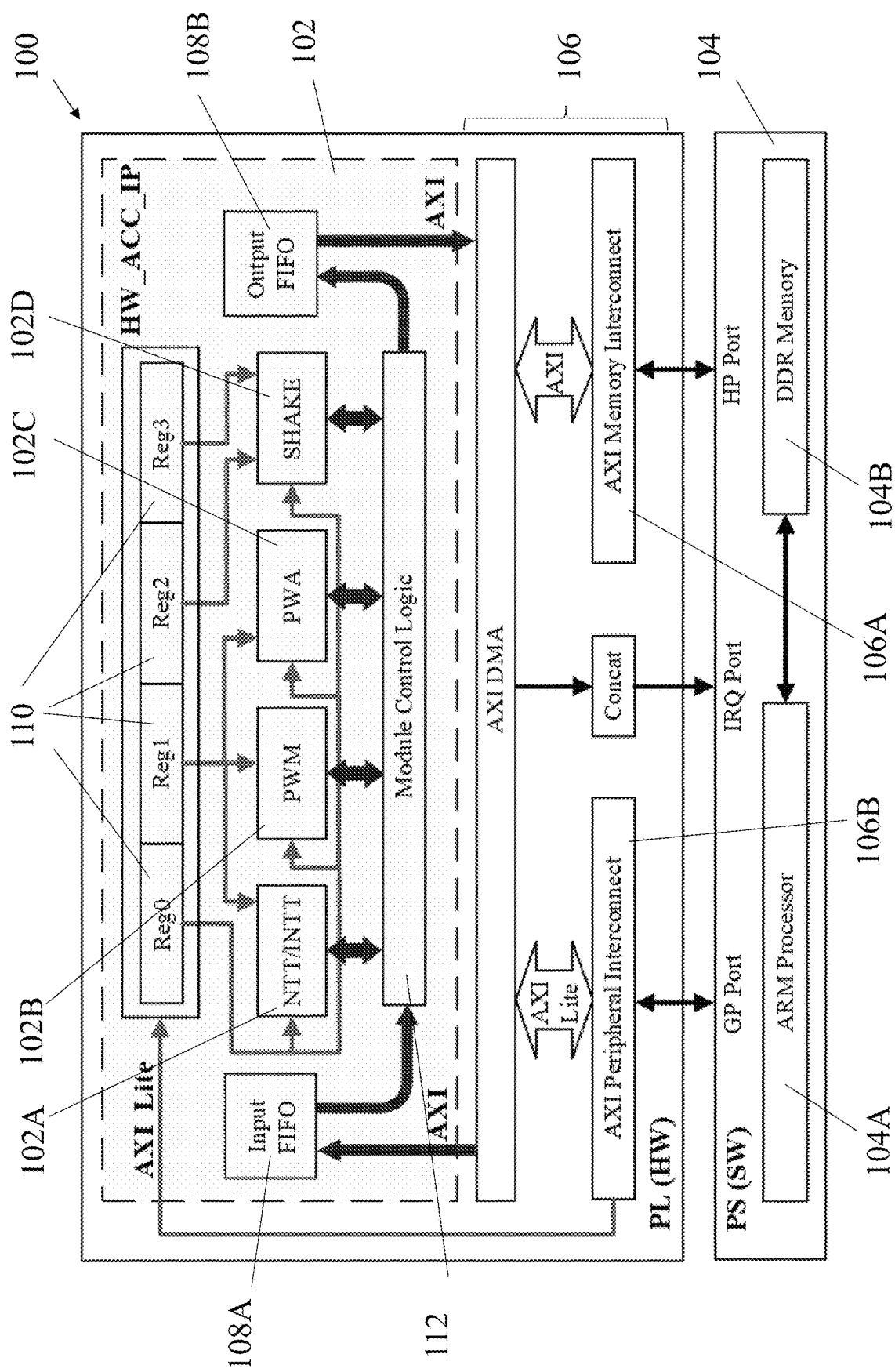
FIG. 1 is a block diagram showing a processor for a cryptosystem having a hybrid processor architecture in accordance with an embodiment of the present invention.

In the following description, a processor for a cryptosystem and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The inventors devised that Public key cryptography provides data confidentiality and authenticity in modern digital communication systems. However, most widely used public-key algorithms including RSA and ECC can be efficiently broken by running the Shor's algorithm on a quantum computer with a few thousand qubits. It has become necessary to find suitable alternative cryptosystems before the practical deployment of quantum computers. Post-quantum cryptography (PQC) is a term to describe the set of cryptographic algorithms that are secure against quantum attacks.

PQC algorithms may be divided into 4 variants, namely lattice-based algorithms, code-based algorithms, multivariate algorithms, and hash-based signatures. The National Institute of Standards and Technology (NIST) has initiated a process of PQC standardization since 2017. The institute announced 17 public-key encryption and Key-establishment (PKE/KEM) schemes and 9 digital signature schemes in the round-1 evaluation. In July 2022, NIST announced the standardization of lattice based KEM CRYSTALS-KYBER, two lattice based signatures CRYSTALS-Dilithium and Falcon, and one hash-based signature SPHINCS+.

Lattice-based cryptography is based on the difficulty of computational lattice problems that cannot be solved efficiently. Examples of such problems include shortest vector problem (SVP), short integer solution problem (SIS), and the learning with error problem (LWE). The SIS problem is to find a short vector s such that $A \cdot s = 0$, given the matrix A. The LWE is to find the vector s from $b = A \cdot s + e$, given the matrix A and the vector b, where e is the hidden error vector. The Ring-SIS and Ring-LWE problems define the matrix A over polynomial ring so it can be obtained under the rotational shift operation of a vector a. This design provides more compactness and efficacy because there is no need to store the large matrix A and the calculation of $A \cdot s$ can be accelerated by using the number theoretic transforms (NTT). The Module-SIS (MSIS) and Module-LWE (MLWE) replace the single ring elements (a and s) with the module elements over the same ring. The trade-offs between security and efficiency are adjustable.

Based on the hardness of the MSIS and MLWE lattice problems, CRYSTALS-Dilithium is designed using the Fiat-Shamir with Aborts technique. CRYSTALS-Dilithium is a digital signature scheme that has been proved secure under chosen message attacks. It has been selected to the third-round finalists of the NIST PQC standardization process and has a good chance to be included in the final standard. The most time-consuming operations in the Dilithium scheme are the extendable-output function (XOF) and the matrix/vector multiplication in the polynomial ring. The parameters of polynomial ring and XOF are the same in different security levels, but only involving fewer or more operations. The officially submitted Dilithium implementation is described in the C language, and there is an AVX2 optimized version.

The deployment of different software and hardware platforms significantly impacts the performance of the cryptosystems. There are many software and hardware design explorations for the evaluation of the NIST PQC algorithm standardization process. Software implementation owns the merits of easy portability and short development time thus normally become the first performance evaluation choice. Dilithium may be implemented on ARM Cortex-M3 and ARM Cortex-M4 to explore the trade-off between speed and memory usage strategy. Alternatively, cached based kernel-level accelerators or SIKE on 32-bit ARMv7-A processors with optimized finite field arithmetic may be implemented in other examples.

Although a relatively longer development cycle may be required, hardware implementation (e.g. FPGA and ASIC) can easily outperform software implementation in terms of speed and power, thus also plays an important role during the standardization process.

Preferably, software/hardware co-design may be a System on a Chip (SoC) design involving software design in microprocessor such as ARM and RISC-V, and hardware design in FPGA and ASIC. By using software/hardware co-design method, the system owns the advantages of both platforms. Specifically, a parallel and pipelined architecture can be explored to speed up the algorithm, while the remaining serial computation and control system can be implemented in software in a short development time. Furthermore, the limited hardware resources in FPGAs make the software/hardware co-design a good choice for efficient system implementations.

For example, software/hardware co-designs may be implemented on NIST round-2 Dilithium, including on ZYNQ-7020 platform with ARM Cortex-A9 processor, and with software on RISC-V processor and hardware on ASIC. In an alternative example, hardware architecture may be used for NTT, point-wise addition/multiplication, and SHA-3 Keccak functions. However, the speed improvement was insignificant because the Keccak related samplers were not implemented in the hardware, which resulted in a large data transmission overhead.

In yet another alternative example, hardware accelerators including sampling with SHA-3 based Pseudo-Random Number Generation (PRNG) and NTT may be designed to adapt the computation of several lattice-based cryptosystems. However, if the system lacks a dedicate acceleration for the time-consuming polynomial matrix-vector multiplication, a longer computation time of the Dilithium may be achieved.

The invention design devise that, in order to further shorten the data transmission overhead and increase the speed of the Dilithium cryptosystem, a high-speed hardware accelerator may be integrated into a flexible SoC architecture. Specifically, the processor in accordance with preferred embodiments of the present invention incorporates a software/hardware co-design of CRYSTALS-Dilithium based on NIST PQC round-3 parameters.

With reference to FIG. 1, there is shown an embodiment of a processor 100 for a cryptosystem, comprising: a hybrid processor architecture including a hardware processor 102, a software processor 104 and an interconnection interface 106 arranged to exchange data between the hardware processor 102 and the software processor 104; wherein the hardware processor 102 comprises a plurality of hardware accelerator modules arranged to perform computational tasks including at least one of number theoretic transforms (NTT) computation, arithmetic operations which are more time-consuming when being performed instead by the software processor 104.

In this embodiment, the hybrid processor includes a software processor 104 such as an ARM processor 104A embedded with a memory controller for accessing memory devices such as DDR memory 104B for temporary storing data or executable instructions which may be processed by the processor 100. In this example, the DDR memory 104B is included as a component of the software processor 104, it should be appreciated by a skilled person in the art that DDR memory or other memory module may be excluded from the processor, for example by including suitable data transmission interface to provide necessary function to support communication between the ARM processor and the DDR memory.

Alternatively, the software processor 104 may include other types of processors such as a computer processing having a x86 or x64 architecture arranged to operate on an x86/x64 operation system and to execute x86/x64 instructions/instruction sets.

Referring to FIG. 1, the processor 100 also includes a hardware processor 102, which may be implemented in any know FPGA or ASIC technology as described earlier. Without wishing to be bound by theory, the functional units and modules of the hardware processor in accordance with the embodiments disclosed herein may be implemented electronic circuitries including but not limited to application specific integrated circuits (ASIC), field programmable gate arrays (FPGA), microcontrollers, and other programmable logic devices configured or programmed according to the teachings of the present disclosure. On the other hand, Computer instructions or software codes running in the computing devices, or computer processors, can readily be prepared by practitioners skilled in the software or electronic art based on the teachings of the present disclosure, may be implemented as the software processor in computing devices.

In this example, the hardware processor comprises a plurality of hardware accelerator modules, namely an NTT/INTT transformation module 102A for performing number theoretic transforms (NTT) computation, a point-wise multiplication (PWM) module 102B and a point-wise addition (PWA) module 102C for performing arithmetic operations (i.e. multiplication and addition/substation operations) and a SHAKE module 102D for performing hashing operations. These operations are more time-consuming when being performed instead by the software processor as software processors or other generic computer processors are not specifically designed for performing these complex calculations, however data such as numbers or polynomials may be handled by hardware processors which include processing logics specifically designed for the data/numbers in specific formats, such as bit-length.

In addition, the processor further comprises an interconnection interface 106 arranged to exchange data between the hardware processor and the software processor. The interconnection interface is also specifically designed for handing data of specific types or formats to facilitate the high-speed operations of the hardware accelerator modules to achieve a high throughput of the calculation results.

Preferably, the interconnection interface includes a high-performance interface 106A and a general-purpose low performance interface 106B arranged to exchange difference types of data between the hardware processor 102 and the software processor 104. By separating the communication of different types of data, better utilization of the "high-speed" communication channel may be achieved, such that the computation data may be provided to the software processor 104 as soon as the computational results are determined by the hardware processor 102.

For example, the interconnection interface includes an Advanced eXtensible Interface (AXI) memory interconnect and an AXI lite peripheral interconnect operable as the high performance interface and the general purpose low performance interface respectively, in which the AXI memory interconnect is arranged to read and write computation data via a data memory controller of the software processor, and to exchange the computation data with the plurality of hardware accelerator modules of the hardware processor through an AXI protocol.

FIG. 1 illustrates an example top level software/hardware co-design architecture. The system is designed according to the Xilinx Zynq SoC architecture, which includes the Processing System (PS) (i.e. the software processor 104) and the Programmable Logic (PL) (i.e. the hardware processor 102). The Advanced eXtensible Interface (AXI) standard is used for the interconnection between the PS and PL. The software runs on the ARM processor on the PS while the designed hardware accelerator runs on the reconfigurable logics on the PL.

In addition, the software processor 104 is arranged to control transfer of computation data and passes configured parameters of the hardware processor 102 through an AXI lite protocol via the AXI peripheral interconnect, in which the AXI lite peripheral interconnect is arranged to read and write a plurality of control registers associated with the plurality of hardware accelerator modules in the hardware processor 102 through the AXI-Lite protocol.

On the PS side, the software processor 104 accesses the data in the DDR for computation. The processor may include a cache to store temporary data for acceleration. The IRQ port may be used to answer the interrupt request from the PL. The HP port is a high-performance interface that connect to the DDR controller. It could read and write a large amount of data in memory through AXI protocol. The GP port is a general-purpose low-performance interface that could read and write registers on the PL through AXI-Lite protocol.

Preferably, the hardware processor 102 further comprises a DMA intermedium 106C arranged to facilitate exchanging the computation data between the AXI memory interconnect and the plurality of hardware accelerator modules through the AXI protocol.

On the PL side, DMA is the intermedium for data communication with DDR, and it is connected to the HP port by using AXI stream protocol. The DMA interacts with the hardware accelerator modules in the hardware processor 102 through input FIFO 108A and output FIFO 108B. The read and write interrupt signals of the DMA pass to the IRQ port through the concat IP. The processor controls the DMA data transfer and passes configured parameters via the GP ports by using AXI lite protocol. The AXI memory interconnect and AXI peripheral interconnect are the intermediate medium between the endpoint IPs and the PS. Their main tasks include memory mapping, bit width conversion, and clock conversion. The AXI stream data transmission in this design uses a 64-bit bus, while the AXI lite control signal uses a 32-bit bus. All modules on the PL operate under the same frequency. Alternatively, computation/control data/signal may be programmed in other bit-lengths in other applications.

In the hardware processor 102, the HW_ACC_IP consists of input and output FIFOs 108, a hardware accelerator (modules), control registers 110 (for controlling the operations of the hardware accelerator modules) and the module control logic 112. The hardware accelerator contains four modules, such as a hybrid NTT/INTT transformation module 102A, a PWM module 102B, a PWA module 102C and a SHAKE module 102D. Each module may operate independently, the architecture and the operation of these modules will be described later in this disclosure. In addition, all modules work with the input and output FIFOs 108, which are included for temporally storing the computational data before and after computation performed by the hardware accelerator modules. The module control logic 112 is an arbiter designed to convey control information between the PS and different acceleration modules.

Preferably, the design configurability is achieved through control registers 110, which are used to convey control signals and design parameters. The four control registers 110 are defined as shown in the following table.

| Register | Control signal | Width | Description |
| --- | --- | --- | --- |
| Reg0 | start_module | 3 | Initiate the start/stop of the corresponding modules. |
| Reg1 | ntt_sel | 1 | Select this NTT or INTT function of the hybrid NTT/INTT module. |
| | pwm_vector_len | 4 | Determine the polynomial vector length in the PWM module. |
| | pwa_add_sub_sel | 1 | Determine the polynomial vector length in the PWA module. |
| | pwa_vector_len | 4 | Select the addition or subtraction operation in the PWA module. |
| Reg2 | shake_mode | 2 | Decide the types of function in the SHA-3 family. |
| | sampler_sel | 1 | Choose the sampler type in uniform rejection sampling or eta rejection sampling. |
| | sampler_eta | 1 | Set the parameter in the eta rejection samples. |
| | shake_write_len | 10 | Define the number of output bytes writing to the output FIFO in the SHAKE module. |
| Reg3 | shake_read_len | 32 | Define the number of bytes that the SHAKE module accept. |

Preferably, the cryptosystem may be a Dilithium-based cryptosystem. The Dilithium signature cryptosystem comprises three parts: Key generation, Sign, and Verify. Specifically, Key generation generates public and private keys. Sign uses the private key to sign the message while the Verify uses the public key to verify the validity of the signature. For ease of understanding from the computation perspective, the content of these algorithms has been enriched by adding computational details and are described in Algorithms 1, 2 and 3, respectively.

In Algorithm 1, the $\zeta$ is a 256-bit true random number (i.e. Step 1), and is expanded by the SHAKE256 to get the $\rho$, $\zeta$, K (i.e. Step 2). The $\zeta$ is extended by the SHAKE128, which generates short vectors $s_1$, $s_2$ after rejection sampling (i.e. Step 3). The $\rho$ is extended by the SHAKE128 to generate polynomial matrix A after rejection sampling (i.e. Step 4). Because Dilithium is designed based on the MLWE problem, A is a polynomial matrix, but not a vector. NTT is used in polynomial matrix-vector multiplication (i.e. Step 5-7). Note that A is sampled in the NTT domain, no further transformation is needed. The Power2Round breaks up high and low bits to shrink the key size (i.e. Step 9). The outputs pk and sk are packed and stored for Sign and Verify (i.e. Step 11).

| Algorithm 1 Dilithium's Key Generation[12] |
|---|
| Output: Public key pk, Secrete key sk |
| 1: $\zeta \leftarrow \{0, 1\}^{256}$ |
| 2: $(\rho, \varsigma, K) \in \{0, 1\}^{256 \times 3} := H_{256}(\zeta)$ |
| 3: $(s_1, s_2) \in S\eta^l \times S\eta^k := H_{128}(\varsigma)$ |
| 4: $\hat{A} \in R_q^{k \times l} := H_{128}(\rho)$ |
| 5: $\hat{s_1} = \text{NTT}(s1)$ |
| 6: $\hat{m_1} = \hat{A} \cdot s1$      // Polynomial Matrix-Vector Multiplication |
| 7: $m_2 = \text{INTT}(\hat{m_1})$ |
| 8: $t := m_2 + s_2$      // Point-wise Addition |
| 9: $(t_1, t_0) := \text{Power2Round}_q(t, d)$ |
| 10: $tr \in \{0, 1\}^{384} := H_{256}(\rho \| t_1)$ |
| 11: Pack pk = $(\rho, t_1)$, pack sk = $(\rho, K, tr, s_1, s_2, t_0)$ |

In Algorithm 2, the packed sk is unpacked for Sign (i.e. Step 1). The SHAKE256 is used for hashing input messages and keys (i.e. Step 2-3). The masking vector y is expanded from $\rho'$, $\kappa$ by using the SHAKE256, and its coefficients are within the range $[-\gamma_1, \gamma_1)$ (i.e. Step 8). The polynomial matrix-vector multiplication A·y is calculated and the High-Bits is used to get the high-order bits $w_1$ (i.e. Step 9-12). The challenge c is obtained by hashing the tr, M, $w_1$ with the SHAKE256, then sampled with T random positions to be ±1 and the others be 0 (i.e. Step 13-14). The c is used to generate the potential signature z (i.e. Step 15-17). Note that less bits are used to store the signature, it needs to generate the hints h before compression to ensure the correctness in Verify (i.e. Step 25). There are four conditions to check whether z will leak information (i.e. Step 21, 26). If yes, the signature will be rejected and then generated again.

The following table lists the parameter values in different security levels.

| Parameters | NIST Security Level | | |
|---|---|---|---|
| | 2 | 3 | 5 |
| q [modulus] | 8380417 | 8380417 | 8380417 |
| d [dropped bits from t] | 13 | 13 | 13 |
| τ[# of ±1's in c] | 39 | 40 | 60 |
| $\gamma_1$[y coefficient range] | $2^{17}$ | $2^{19}$ | $2^{19}$ |
| $\gamma_2$[lower rounding range] | (q − 1)/88 | (q − 1)/32 | (q − 1)/32 |
| (k, l) [dimensions of A] | (4, 4) | (6, 5) | (8, 7) |
| η [secrete key range] | 2 | 4 | 2 |
| β [τ· η] | 78 | 196 | 120 |
| ω [max # of 1's in h] | 80 | 55 | 75 |

In Algorithm 3, public key pk and signature σ are unpacked for Verify (i.e. Step 1-2). The message M and public key are hashed with the SHAKE256 (i.e. Step 3). The NTT is used to calculate Az−ct (i.e. Step 5-10). The hint h is used to correct calculation errors in data compression (i.e. Step 10). There are three conditions to check whether the obtained signature can meet the security requirements (i.e. Step 12). If the security requirements are not satisfied simultaneously, the signature will be rejected.

| Algorithm 2 Dilithium's Sign[12] |
|---|
| Input: Secrete key sk, Message M |
| Output: Signature σ |
| 1: Unpack sk = $(\rho, K, tr, s_1, s_2, t_0)$ |
| 2: $\mu \in \{0, 1\}^{384} := H_{256}(tr \| M)$ |
| 3: $\rho' \in \{0, 1\}^{384} := H_{256}(K \| \mu)$ |
| 4: $\hat{A} \in R_q^{k \times l} := H_{128}(\rho)$ |
| 5: $\hat{s_1} = \text{NTT}(s1), \hat{s_2} = \text{NTT}(s2), \hat{t_0} = \text{NTT}(t0)$ |
| 6: $\kappa := 0, (z, h) := \bot$ |
| 7: while $(z, h) = \bot$ do |
| 8:    $y \in \tilde{S}_{\gamma_1}^l = H_{256}(\rho', \kappa)$ |
| 9:    $\hat{y} = \text{NTT}(y)$ |
| 10:    $\hat{w} := \hat{A} \cdot \hat{y}$      // Polynomial Matrix-Vector Multiplication |
| 11:    $w = \text{INTT}(\hat{w})$ |
| 12:    $w_1 := \text{HighBits}_q(w, 2\gamma_2)$ |
| 13:    $\tilde{c} \in \{0, 1\}^{256} := H_{256}(\mu \| w_1)$ |
| 14:    $c \in B_\tau := \text{SampleInBall}(\tilde{c})$ |
| 15:    $\hat{c} = \text{NTT}(c)$ |
| 16:    $v_1 = \text{INTT}(\hat{c} \cdot \hat{s_1})$      // Polynomial Vector Multiplication |
| 17:    $z := y + v_1$      // Point-wise Addition |
| 18:    $v_2 = \text{INTT}(\hat{c} \cdot \hat{s_2})$      // Polynomial Vector Multiplication |
| 19:    $v_3 = w - v_2$      // Point-wise Subtraction |
| 20:    $r_0 := \text{LowBits}_q(v_3, 2\gamma_2)$ |
| 21:    if $\|z\|_\infty \geq \gamma_1 - \beta$ or $\|r_0\|_\infty \geq \gamma_2 - \beta$ then |
| 22:      $(z, h) := \bot$ |
| 23:    else |
| 24:      $v_4 = \text{INTT}(\hat{c} \cdot \hat{t_0})$      // Polynomial Vector Multiplication |
| 25:      $h = \text{MakeHint}_q(-v_4, v_3 + v_4, 2\gamma_2)$      // Point-wise Addition |
| 26:      if $\|v_4\|_\infty \geq \gamma_2$ or the # of 1's in h ≥ ω then |
| 27:        $(z, h) = \bot$ |
| 28:      end if |
| 29:    end if |
| 30:    $\kappa := \kappa + 1$ |
| 31: end while |
| 32: Pack σ = $(z, h, \bar{c})$ |

| Algorithm 3 Dilithium's Verify[12] |
| --- |
| Input: Public key sk, Message M, signature σ |
| Output: The validity of the signature |
| 1:     Unpack σ = (z, h, c̃) |
| 2:     Unpack pk = (ρ, $t_1$) |
| 3:     μ ∈ $\{0, 1\}^{384}$ := $H_{256}$ ($H_{256}$(ρ‖$t_1$)‖M) |
| 4:     Â ∈ $R_q^{k \times l}$ := $H_{128}$ (ρ) |
| 5:     ẑ = NTT(z) |
| 6:     ŵ₁⁻ := Â · ẑ                           // Polynomial Matrix-vector Multiplication |
| 7:     c := SampleInBall(c̃) |
| 8:     ĉ = NTT(c), $\hat{t}_1^-$ = NTT(t1 · $2^d$) |
| 9:     $w_2$ = ĉ · $\hat{t}_1^-$                            // Polynomial Vector Multiplication |
| 10:    w' := $UseHint_q$ (h, $w_1$ − $w_2$, 2$γ_2$)             // Point-wise Subtraction |
| 11:    $c_2$ = H256 (μ‖w') |
| 12:    Return[‖z‖$_∞$ < $γ_1$ − β] and [c̃ = $c_2$] and [# of 1's in his ≤ ω] |

The following table describes the operations in the above algorithms and the corresponding functions used in the NIST Dilithium reference C code. Note that Dilithium has three different security levels, which provides a trade-off in security and performance.

| Operation | Function | Description |
| --- | --- | --- |
| $H_{128}$ | keccak_permute | SHAKE128 XOF. |
| $H_{256}$ | keccak_permute | SHAKE258 XOF. |
| $S_η$ | rej_eta | Rejection sampling with coefficient in [−η, η]. |
| $R_q$ | rej_uniform | Rejection sampling with coefficient in [−q, q]. |
| $S_{γ1}$ | polyz_unpack | Bit-pack to get member in[−$γ_1$, $γ_1$). |
| NTT | ntt, monty_reduce | Transform polynomial to NTT domain. |
| INTT | intt, monty_reduce | Inverse NTT transform. |
| Polynomial Matrix-Vector Multiplication | point_wise_mul, monty_reduce, point_wise_add | Point-wise multiply polynomial matrix and vectors. |
| Polynomial Vector Multiplication | point_wise_mul, monty_reduce | Point-wise multiply polynomial vectors. |
| Point-wise Addition | point_wise_add | Point-wise add polynomial vectors. |
| Point-wise Subtraction | point_wise_sub | Point-wise subtract polynomial vectors. |
| Power2 Round | power2round | Power of two rounding. |
| HighBits | poly_decompose | Decompose to get high-order bits. |
| LowBits | poly_decompose | Decompose to get low-order bits. |
| MakeHint | make_hint | Compute hint for overflow bits. |
| UseHint | use_hint | Use hint to correct overflow bits. |
| Sample InBall | poly_challenge | Sample polynomial with τ nonzero coefficients in {1, 1}. |

Preferably, the workload may be divided between the software processor 104 and the hardware processor 102. For example, an ARM Cortex A9 CPU at 666 MHz may be used as a software processor, which is operable to execute Dilithium reference C code implementation in NIST Security Level 3 and with the TCF profiler. The inventors analyzed the schedule and data dependency of the algorithm, conduct profiling, and identify the time-consuming functions in the system, and the result is shown in the following table.

| No. | Operation Type | Time Percentage (%) |
| --- | --- | --- |
| 1 | SHA-3 | 45.7 |
| 2 | INTT | 22 |
| 3 | NTT | 11.6 |
| 4 | PWM | 9.68 |
| 5 | PWA | 3.94 |
| 6 | Sampling | 1.99 |
| 7 | Others | 5.09 |

As shown in the table, the most time-consuming part is the SHA-3 related operation, including the SHAKE128/SHAKE256 permutation, input absorb and output store functions. The second is INTT operation, and the third is NTT operation. Both NTT and INTT operations include modular multiplication and occupy around 34% of the computing time. The fourth is the PWM operation, which is the point-wise modular multiplication with different polynomials. The fifth is the PWA operation, which includes point-wise addition/subtraction, and their subsequent modular operations. Sampling operation occupies around 2% of the total time, which includes the rejection eta sampling and rejection uniform sampling. There are 5% remaining operations are listed as Others, such as signature pack operation for 0.57%, signature unpack operation for 1.39%, the decompose operation in make/use hint for 1.08%, check norm operation in signature checking for 0.56%, the SampleInBall operation for 0.06%, etc.

Based on the analysis results shown above, four hardware modules are designed to accelerate the time-consuming operations in Dilithium. They are the hybrid NTT/INTT module 102A, point-wise multiplication (PWM) module 102B, point-wise addition (PWA) module 102C, and the SHAKE module 102D. The hybrid NTT/INTT and PWM modules handle the polynomial multiplication computation. The PWM and PWA modules are responsible for the multiplication/addition of matrices and vectors, while the SHAKE module is responsible for all the hash related works. The cooperation of these modules could manage up to 94.91% of the computation in Dilithium. In order to increase the design flexibility to support Dilithium computation for all the security levels, the hardware modules may be parameterized to support runtime configuration.

The remaining functions, such as signature pack and unpack operations, and the decompose operation, are neither time-consuming nor friendly to hardware design, therefore may be kept running in the software. Alternatively, they may also be implemented as hardware modules in some alternative examples.

NTT and Inverse-NTT (INTT) transform are used to accelerate the multiplication of two polynomials. The classical schoolbook polynomial multiplication has a complexity of $O(n^2)$, while the NTT can reduce it to $O(n \log n)$. NTT is generally a Discrete Fourier Transform (DFT) over an integer field or ring. The NTT used is the DFT over polynomial ring $z_q [x]/\phi (x)$, where $z_q$ is the number under modulo q, and $\phi(x)$ is an irreducible polynomial. For NTT, the NTT domain polynomial coefficients $\hat{a}_i$, are calculated by $\hat{a}_i=\Sigma_{j=0}^{n-1}\alpha_j\omega^{ij}$ in $z_q$, where $\omega$ is the pre-determined twiddle factor. On the other hand, in INTT, the normal domain coefficients are computed as $\alpha_i=n^{-1}\Sigma_{j=0}^{n-1}\hat{a}_j\omega^{-ij}$.

When directly applying NTT in the polynomial multiplication, it requires n zeros appended to each input, (i.e. $a_1+a_2\times\omega$, $a_1-a_2\times\omega$). For the GS structure, the multiplication takes places only after subtract operation (i.e. $a_1+a_2$, $(a_1-a_2)\times\omega$).

In the reference software implementation of Dilithium, NTT and INTT may be implemented separately by applying CT structure in NTT and GS structure in INTT. This method could eliminate coefficient-wise multiplications before NTT and coefficient-wise multiplications after INTT. However, if NTT and INTT are implemented separately in hardware, it will double the hardware resource usage. For example, a unified BFU, which combined both CT and GS structure in a reconfigurable processor, may be used. Alternatively, the BFU may comprise a unified structure and which further reduces the additional cycle for the multiplication of $n^{-1}$. The multiplication of $n^{-1}$ is achieved by (x>>1) when x is even or ((x>>1)+(q+1)/2) when x is odd. Therefore, the unified CT/GS architecture may be used in the following hybrid NTT/INTT algorithm to reduces hardware resources and computation time.

---

Algorithm 4 Hybrid NTT/INTT Algorithm

Input: a(x) with coefficients $\{a_1, a_2 \ldots a_n\}$, or â(x) with coefficients $\{â_1, â_2 \ldots â_n\}$
Input: Pre-computed twiddle factor zeta[i] = $\gamma^{Bit\ Reverse[i]}$;
Output: NTT(a(x)) or INTT(â(x))
 1: Initialization k ← 0 or n
 2: for m = 0 ; m < log$_2$n ; m++ do 3:     $len \leftarrow \left(\frac{n}{2} >> m\right)$ or (1 << m)

4:     for i = 0 ; i < n ; i = j + len do
 5:         ω ← zeta[++k] or q − zeta[−−k]
 6:         for j = i ; j < l+ len ; j++ do
 7:             $r_1 \leftarrow a_{l+len}$ or $(â_j − â_{j+len})/2$
 8:             $u_1 \leftarrow r_1 \cdot \omega$                    // Modular Multiplication (Multiplication + Modular Reduction)
 9:             $r_2 \leftarrow u_1$ or $â_{j+len}$
10:             $u_2 \leftarrow a_j + r_2$ or $â_l + r_2$ 11:             $t_1 \leftarrow u_2$ or $\frac{u_2}{2}$ 12:             $t_2 \leftarrow (a_j − u_1)$ or $u_1$
13:             $a_j$ or $â_j \leftarrow t_1$
14:             $a_{j+len}$ or $â_{j+len} \leftarrow t_2$
15:         end for
16:     end for
17: end for

--- which doubles the length of the inputs and requires additional reduction to the ring Rq. To address these issues, the negative wrapped convolution (NWC) method can be explored. By applying NWC in polynomial multiplication, one needs to first perform point-wise multiplications of $a_i$ and $\gamma^i$, where $\gamma$ is the square root of $\omega$, then then transform two polynomials a(x) and b(x) into NTT domain to get â(x) and b̂(x). Next, point-wise multiply these two polynomials and get ĉ(x). After that, use INTT to transform the results back to normal domain and get the results c (x). Last step is to perform coefficient-wise multiplication of $c_i$ and $\gamma^{-i}$.

The two examples butterfly units (BFU) for NTT/INTT calculation are Cooley-Tukey (CT) and Gentle-Sande (GS). Both structures require same number of operations to compute NTT and INTT in NWC. For the CT structure, the multiplication takes place before the add/subtract operation The Algorithm 4 shows the hybrid NTT/INTT algorithm. According to the parameter setting of the Dilithium, the polynomial length n is 256, and the primitive 2n-th root of unity $\gamma$ is 1753 in $Z_q$. The arithmetic is performed under modulus q, which is the prime number $8380417=2^{23}-2^{13}+1$. The modular operation is required after the multiplication of $r_1$ and $\omega$ (i.e. Step 8). The modulus method may be adapted, and an efficient modular reduction algorithm for $Z_{2^{23}-2^{13}+1}$ may be obtained in Algorithm 5. It is worth noting that in NTT, the pre-computed twiddle factor is obtained by first calculating zeta[i]=$\gamma^i$, i=0, 1, . . . , n−1, and then switching the coefficient order through the bit reverse function. INTT first calculates zeta[i]=$\gamma^i$, i=n, n+1, . . . , 2n−1, and then performs bit reverse operation. Since $\gamma^n$=−1 mod q, one could deduce the pre-computed twiddle factors of INTT from NTT by flipping the sign bit. By using this method, the storage space for the twiddle factors may be reduced by half comparing with the traditional method.

Algorithm 5 Modular Reduction in $\mathbb{Z}_{2^{23}-2^{13}+1}$

```
Input: a[45:0]
Input: q[22:0] = 2²³ − 2¹³ + 1
Output: r = a mod q
  1:    c[13:0] = a[45:33] + a[32:23]
  2:    e[10:0] = c[13:10] + c[9:0]
  3:    f[22:0] = 2¹³ · (e[10] + e[9:0] − e[10] − c[13:10])
  4:    x[23:0] = f[22:0] + a[22:0]
  5:    if x ≥ q then
  6:        x[22:0] = x[23:0] − q[22:0]
  7:    end if
  8:    d[22:0] = a[45:33] + a[45:23]
  9:    r[23:0] = x[22:0] − d[22:0]
 10:    if r ≥ q then
 11:        r[23:0] = r[23:0] − q[22:0]
 12:    end if
 13:    if r < 0 then
 14:        r[22:0] = r[23:0] + q[22:0]
 15:    end if
 16:    Return r
```

Preferably, the plurality of hardware accelerator modules includes an NTT transformation module, more preferably a hybrid NTT/Inverse-NTT (INTT) transformation module configurable to operate in a selected one of an NTT mode or an INTT mode, arranged to accelerate multiplication of two polynomials.

Figure 2A:
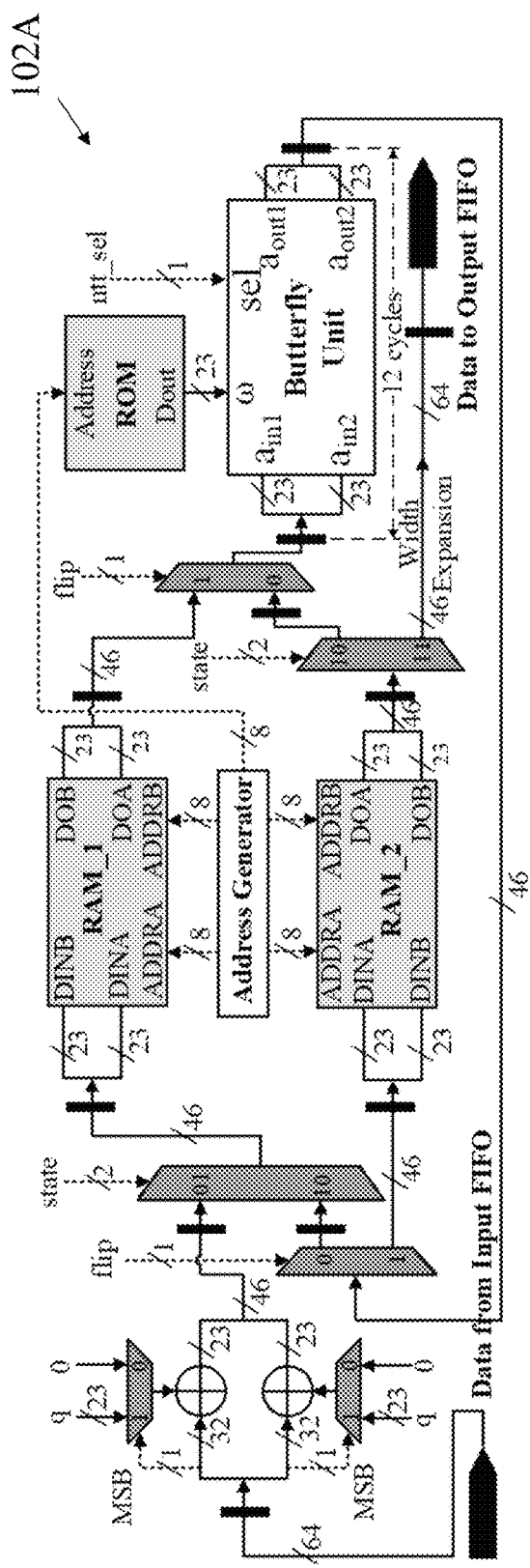
FIG. 2A is a schematic and data flow diagram of a hybrid NTT/INTT hardware design of the NTT/INTT hardware accelerator module in the hardware processor of the processor of FIG. 1.
Figure 2B:
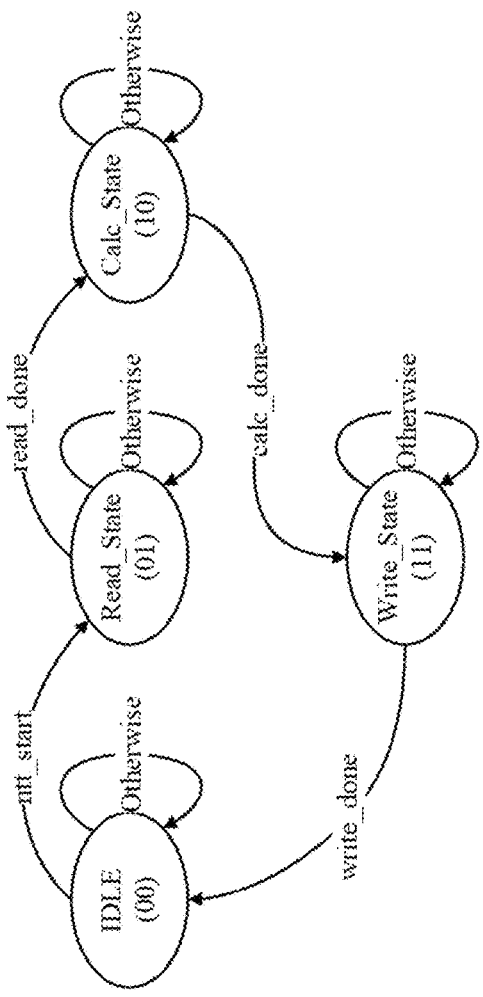
FIG. 2B is a control state diagram of the module control logic associated with an operation of the NTT/INTT hardware accelerator module of FIG. 2A.

With reference to FIGS. 2A and 2B, the NTT transformation module 102A is arranged to operate according to an NTT finite state transition with following states:

receiving two polynomials from an input FIFO of the hardware processor to a first RAM unit in the NTT transformation module in a read state;

feeding the two polynomials stored in the first RAM unit into a butterfly unit, and storing computation results obtained by the butterfly unit in a second RAM unit in the NTT transformation module in a calculation state;

writing the computation results to the output FIFO of the hardware processor in a write state; and returning the NTT transformation module in an idle state.

The hybrid NTT/INTT hardware module 102A is designed as shown in FIG. 2A, and a finite state machine may be designed to manage the working schedule of the entire NTT/INTT computation, in which the state transition is shown in FIG. 2B. Preferably, there are four states, so the 2-bit signal is used to represent each state. The default state is the idle state. When the hybrid NTT/INTT module is initiated, the ntt_start signal drives the idle state into the read state. The data is read from the input FIFO in the read state, the NTT/INTT calculations happen in the calculation state, while the result is written into the output FIFO in the write state. The done signal is asserted when a state is complete and hence, the next state immediately starts.

The NTT transformation module 102A may be further arranged to resize the input data, the output data and/or the computation results with different bit lengths. As shown in FIG. 2A, in one example operation, 64-bit data is read from the input FIFO. The polynomial coefficients are stored as 32-bit integers in the processor, so each 64-bit input data contains two polynomial coefficients. The two 32-bit polynomial coefficients are transformed under the modular q to cut the bit length to 23-bit. The width of the ROM and the two RAM blocks is 23-bit. The pre-computed twiddle factor ω is stored in a single-port ROM with a depth of n=256. The temporary results from the butterfly unit are stored in dual-port RAMs with a depth of n/2=128. The control flow of hybrid NTT/INTT module mainly includes control signals and memory address generators. The 2-bit state signal indicates the state in FIG. 2b. When the state signal is $(01)_2$ (read state), data is read from the input FIFO to the RAM_1. A read counter is used in the address generator to generate the address of the RAM_1. When the state signal is $(10)_2$ (calculation state), the read data is fed into the butterfly unit from one RAM. At the same time, the butterfly unit writes the computed data into the other RAM. The 1-bit ntt_sel signal selects the NTT or INTT calculation. The whole calculation process is designed following the Algorithm 4. Note that there are three for loops in Algorithm 4, so three counters are used in the address generator for the loop address generation. The 1-bit flip signal is the least significant bit of the first counter (i.e. Step 2), which indicates round changes in NTT calculation. In different rounds of calculation, the two RAMs take turns to read and write. The unified butterfly structure takes $a_1$, $a_2$, ω as inputs, calculates $a_1+a_2\times\omega$, $a_1-a_2\times\omega$ in NTT, and calculates $(a_1+a_2)/2$, $(a_1-a_2)\times\omega/2$ in INTT (i.e. Step 7-14). When the state signal is $(11)_2$ (write state), the 46-bit output data from the RAM_2 is expanded to 64-bit, then written into the output FIFO. A write counter is used in the address generator to generate the address of the RAM_2. After completing the writing operation, the NTT transformation module returns to the idle state and is ready for the next read/write cycle.

Figure 3:
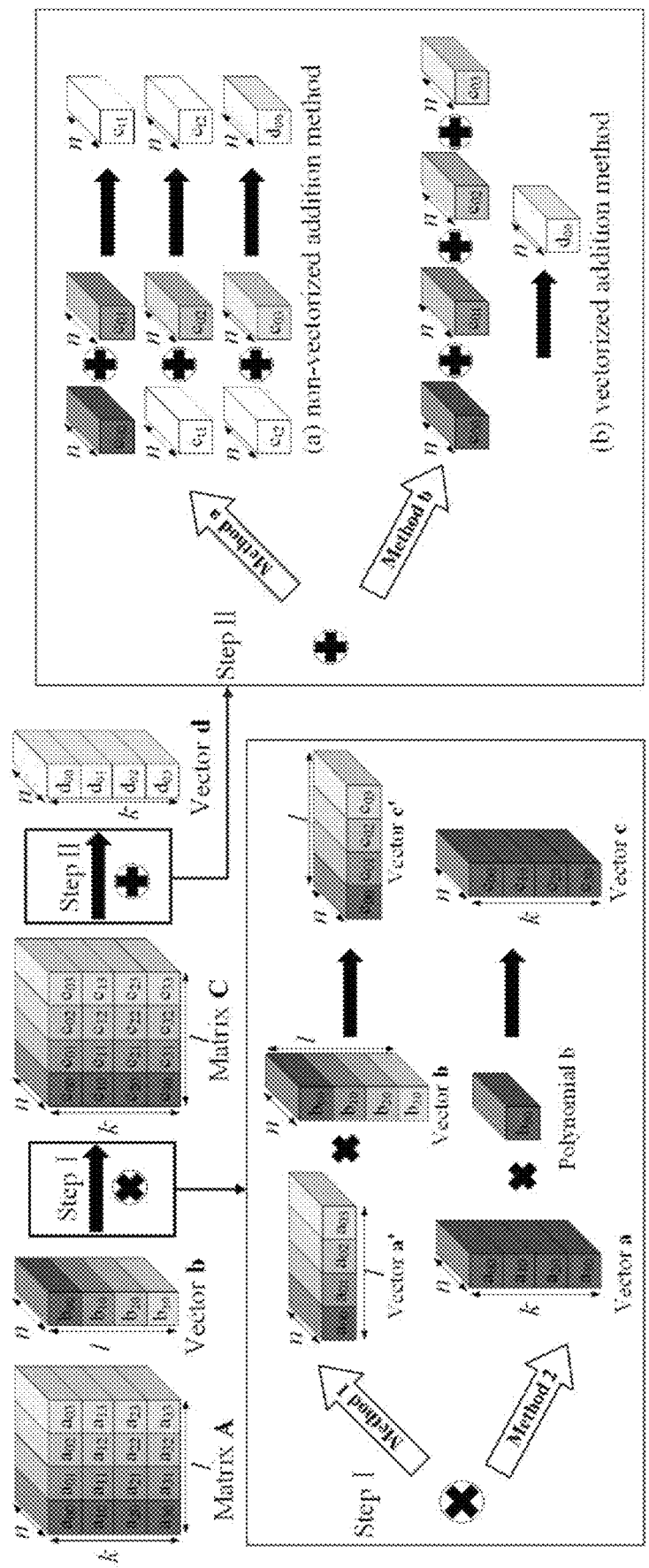
FIG. 3 is an illustration showing an operation of polynomial matrix-vector multiplication.

With reference to FIG. 3, the hardware accelerator modules may perform computational tasks involving arithmetic operations such as polynomial matrix-vector multiplication. In Dilithium, there exist large number of polynomial matrices and polynomial vectors that require the calculation of point-wise multiplication (PWM) and point-wise addition (PWA). Hence, an efficient hardware design to accelerate these computations is essential to a high speed Dilithium system.

The array a[n] may be used to represent all the n coefficients and a[i] to be one of the coefficients from polynomial a(x), where $a(x)=\Sigma_{i=0}^{n-1}a[i]x^i$, letting a to be a polynomial column vector and the coefficients of a are stored in a two-dimensional array a[l] [n], where l is the column length of the vector. Set A to be a polynomial matrix and its coefficients are stored in a three-dimensional array a[k] [l] [n]. Assume the input polynomial coefficients are a[n] and b [n], and the output polynomial coefficients are c [n]. Then, c [i]=a[i]·b [i] mod q in PWM may be obtained, while in PWA, c [i]=a[i]+b [i] mod q may be computed.

In the Dilithium software reference design, each function only completes one PWM/PWA of two polynomials, which ensures the flexibility of the software. However, a parallel architecture may be used to accelerate these computations in hardware. Take the polynomial matrix-vector multiplication shown in FIG. 3 as an example. Let A be a k×l polynomial matrix, and $a_{ij}$ represent polynomial with length n. b is a polynomial vector, and $b_{ij}$ is the polynomial with length n. The polynomial matrix-vector multiplication is divided into two steps. In step I (multiplication), each row of the polynomial matrix A is multiplied by the polynomial vector b to get a row of polynomial vector in polynomial matrix C. In step II (addition), the polynomial vectors of each row in matrix C are added correspondingly to obtain the polynomial column vector d.

There are two methods to compute the multiplication of step I. In method 1, one row of matrix A is taken and multiplied by the column vector b; In method 2, one column of matrix A is taken and multiplied by one polynomial in the column vector b. Both methods need to transmit k×l×n coefficients of matrix A. However, for vector b, method 1 needs to transmit k×l×n coefficients, while method 2 only need to transmit l×n coefficients. In method 2, the polynomial b is reused to multiply with the column vector of length k, so the data transmission overhead of vector b is only 1/k times of method 1. Therefore, in one example embodiment, the hardware modules for PWM may be designed according to the method 2, which enables a significant reduction in the number of data transfers.

Figure 4A:
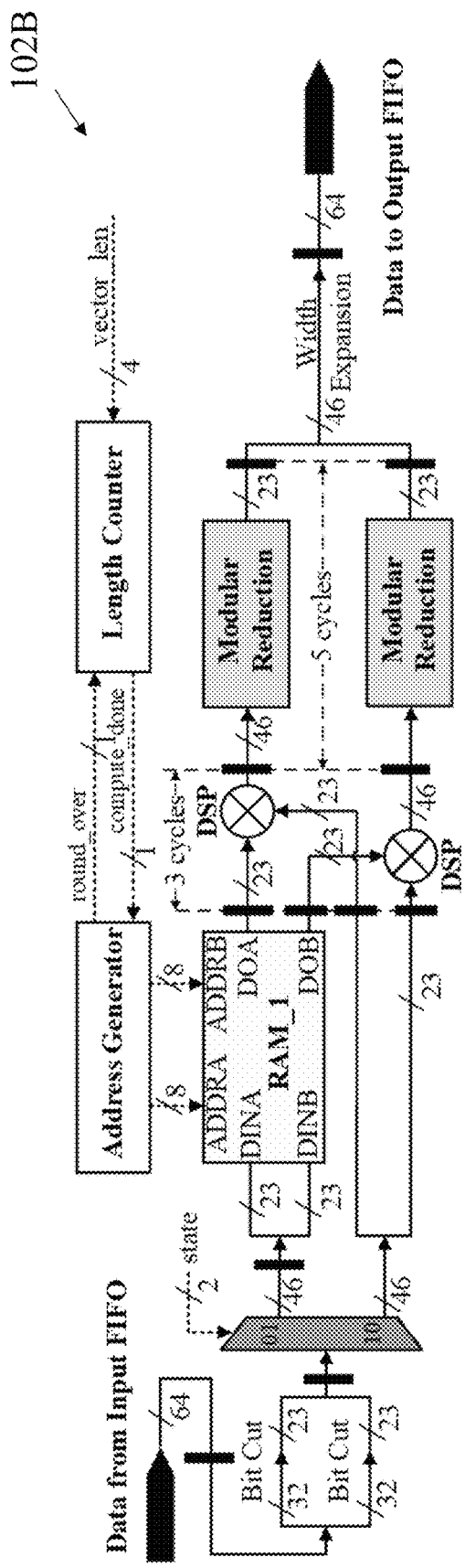
FIG. 4A is a schematic and data flow diagram of a Point-wise multiplication (PWM) accelerator module in the hardware processor of the processor of FIG. 1.
Figure 4B:
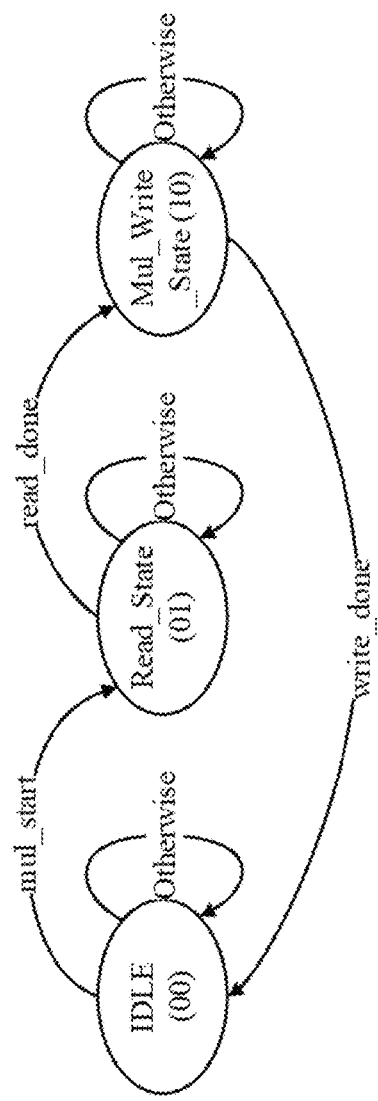
FIG. 4B is a control state diagram of the module control logic associated with an operation of the PWM hardware accelerator module of FIG. 4A.

With reference to FIGS. 4A and 4B, the point-wise multiplication (PWM) module 102B is arranged to accelerate point-wise multiplication of two polynomials, and arranged to operate according to a PWM finite state transition with following states:

receiving two polynomials from an input FIFO of the hardware processor to RAM in two multipliers in the PWM module in a read state;

completing the point-wise multiplication and modular reduction operations, then writing computation results to the output FIFO of the hardware processor in a multiplication-writing-state; and after carrying out reading, computing, and writing computation data in a pipelined manner, returning the point-wise multiplication module in an idle state.

The PWM algorithm is designed as shown in Algorithm 6. The vector length k is configurable: when k=1, it is used to accelerate the point-wise multiplication of two polynomials. When k is greater than 1, it is used to compute the point-wise multiplication of the polynomial column vector and the polynomial. In this example, the transmitted polynomial a is reused to multiply with all the polynomials in vector b, thus reducing the transmission of polynomial a from k to only 1 time.

---

Algorithm 6 Vectorized Point-wise Multiplication

Input: Polynomial a with coefficient array a [n]
Input: Polynomial vector b with coefficient array b[k] [n]
Output: polynomial vector r = b · a
1:    for i = 0; i < k; i++ do
2:       for j = 0; j < n; j++ do
3:          r [i] [j] = a[j] · b[i] [j] mod q
4:       end for
5:    end for
6:    Return r with coefficient array r [k] [n]

---

Referring to FIG. 4A, the length counter is a 4-bit counter to count the length of a polynomial vector. The address generator uses the information of length counter to generate the read/write address of the RAM_1. Note that the coefficients of polynomial a are stored in the RAM_1 while the coefficients of b are read directly from the input FIFO. The control state of PWM module is shown in FIG. 4B. Firstly, the polynomial a is read from the input FIFO to the RAM_1 in read state. Two multipliers receive data from the Input FIFO and the RAM_1, complete the point-wise multiplication and modular reduction operations, then write the results to the output FIFO in the mul_write_state. Reading, computing, and writing the data are carried out in a pipelined manner. The hardware architecture of modular reduction is designed following the Algorithm 5.

Figure 5A:
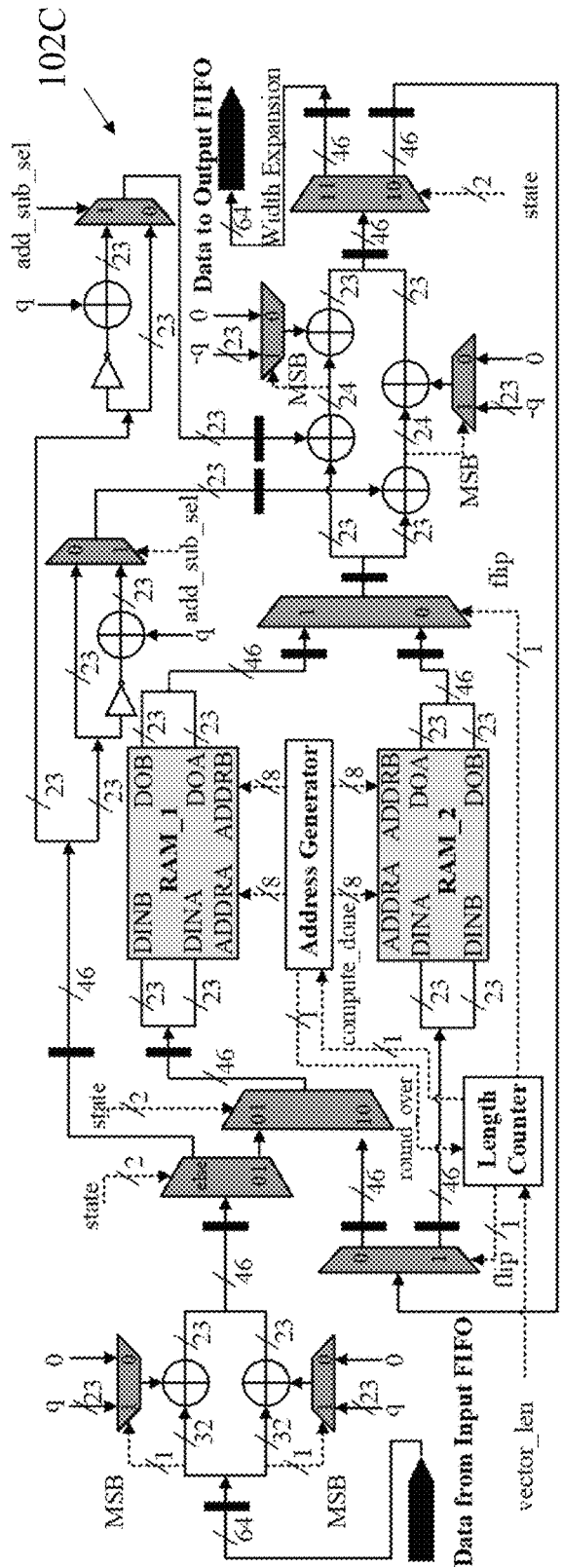
FIG. 5A is a schematic and data flow diagram of a Point-wise addition (PWA) accelerator module in the hardware processor of the processor of FIG. 1.
Figure 5B:
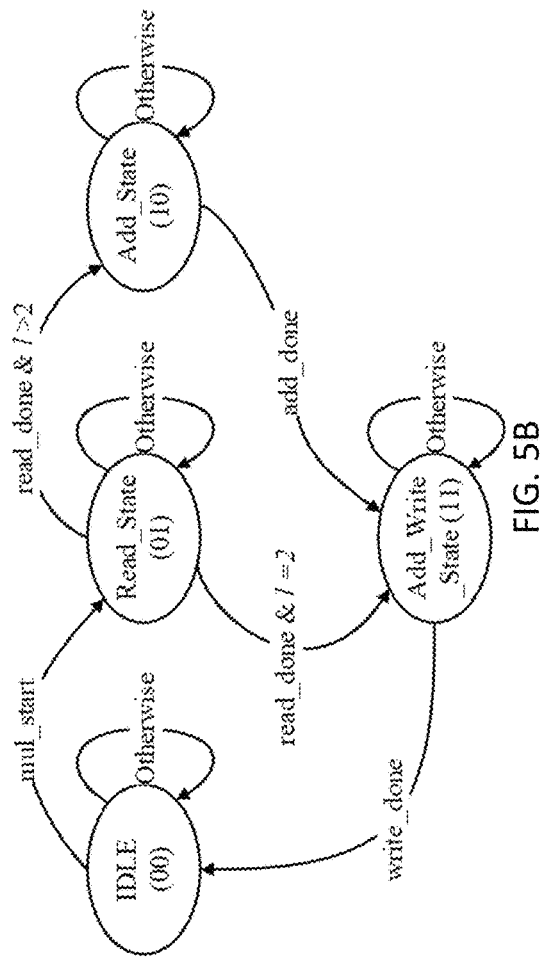
FIG. 5B is a control state diagram of the module control logic associated with an operation of the PWA hardware accelerator module of FIG. 5A.

In addition, referring to FIGS. 5A and 5B, the plurality of hardware accelerator modules further includes a point-wise addition (PWA) module 102C arranged to accelerate point-wise addition or subtraction of two polynomials There are two methods to compute the polynomial addition (i.e. step II) in FIG. 3. In method a, two polynomials $c_{00}$ and $c_{01}$ are transmitted from the software to the hardware for computation first. Then, the temporary result $c_{t1}$ is transmitted back to software. Next, the polynomials $c_{t1}$ and $c_{02}$ are transmitted and computed following the above process repeatedly until the end of the computation. This method is flexible for parameterized design but required a 3(l−1)×n coefficients transmission overhead.

In order to reduce the transmission workload, method b may be adopted, in which the temporary results are kept in hardware for further reuse. Only the polynomials in the same row and the final results are transmitted. Both methods need to transmit 1×n input coefficients and n output coefficients. However, method a needs to additionally transmit (l−2)×n intermediate input coefficients and (l−2)×n intermediate output coefficients. Therefore, the vectorized PWA is designed according to method b to reduce the number of data transfer.

The PWA algorithm is shown in Algorithm 7. The PWA algorithm could perform different computations: when l=2 and configured as addition/subtraction, point-wise addition/subtraction of two polynomials is computed; When l is greater than 2, point-wise addition of polynomial vector of length l is conducted. From the above analysis, the vectorized addition method can reduce the data transmission from 3(l−1)×n coefficients to (l+1)×n coefficients.

---

Algorithm 7 Vectorized Point-wise Addition

Input: Polynomial a with coefficient array a[n]
Input: Polynomial vector b with coefficient array b[l − 1] [n]
Output: Polynomial r with coefficient array r [n]
1:    for i = 0; i < l − 1; i++ do
2:       for j = 0; j < n; j++ do
3:          if i == 0 then
4:             r[j] = a[ j] + b [i] [ j] mod q
5:          else
6:             r [j] = r[j] + b[i] [j] mod q
7:          end if
8:       end for
9:    end for
10:   Return r

---

Based on Algorithm 7, the hardware architecture of PWA referring to FIG. 5A may be obtained, and the PWA module 102C is arranged to operate according to a PWA finite state transition with following states:

receiving at least two polynomials from an input FIFO of the hardware processor to RAM in two adders in the PWA module in a read state;

completing point-wise addition, then writing computation results to the output FIFO of the hardware processor in an addition-writing-state; and after carrying out reading, computing, and writing computation data in a pipelined manner, returning the point-wise addition module in an idle state.

Alternatively, the point-wise addition module may perform subtraction by adding a negative representation of one of the two polynomials to another one, when the control register sets the PWA module to operate in the subtraction mode.

In addition, the PWA finite state transition further includes an addition state in which more than two sets of polynomials are added by performing point-wise addition before the point-wise addition module entering the addition-writing-state.

With reference also to FIG. 5B, the polynomial is read from the input FIFO into the RAM_1 in read_state. If l=2, it will directly enter the add_write_state after the read_state, complete point-wise addition/subtraction, and write data into the output FIFO. Subtraction is achieved by taking the negative of the input FIFO data and then by addition. If l is greater than 2, it will first enter the add_state after the read_state, perform point-wise additions, and then enter the add_write_state to complete the last set of point-wise addition and finally write data to the output FIFO. Two adders receive data from the RAM and the input FIFO when performing point-wise addition, and then another two adders are used to compute modular reduction over q. The RAM_1 and RAM_2 take turns to send and receive data in add_state, controlled by the 1-bit flip signal in FIG. 5.

Preferably, the plurality of hardware accelerator modules includes a hash module arranged to perform a plurality of operations related to hashing of computation results. For example, the hash module is a SHAKE module 102D as described earlier arranged to perform SHA-3 related PRNG functions and sampling functions.

SHAKE functions may include SHAKE128 and SHAKE256. They are extendable-output functions based on the Keccak algorithm in SHA-3 family, which take any size of input and generate any length of output. Based on the profiling results as described earlier, the Keccak function is the most time-consuming function. Hence, accelerating this function would have a significant improvement on the overall system performance.

In the Dilithium algorithm, the SHAKE256 generates random seeds and its outputs can be used by other operations directly. However, the SHAKE128 is used to generate numbers such as the polynomial matrix A, short vectors s1 and s2 that should satisfy some specific requirements. In this case, the outputs of the SHAKE128 need to be sampled to meet the corresponding requirements. In the software implementation, the Keccak function and the samplers in SHAKE are implemented separately. First, the Keccak function generates a certain number of random seeds. Then the seeds pass through the samplers for sampling. If the output cannot meet the requirements after sampling, the aforementioned operations need to be performed again. However, in the software/hardware co-design, if the Keccak function and the sampler are implemented separately, the data transmission overhead would be non-negligible. In addition, extra control logic and space for restoration are required. Therefore, the processor in accordance with these embodiments tightly combines the Keccak function and samplers into one module to save the transmission time and design space.

The hardware design of the SHAKE module is further explained with reference to FIGS. 6A to 6C. With reference to FIG. 6A, it shows the data flow of the SHAKE module 102D. This module mainly consists of three units, including the read ctrl unit, the Keecak core unit and the sampling unit. The read ctrl unit controls the read data flow, which is shown in FIG. 6B. In the read_state, data is read from the input FIFO to the Keccak core unit. When the Keccak core unit is full and cannot receive new input data, a 1-bit full signal is sent. The control state then transfers to the hold state, where a hold counter is used to count until the end of hold state.

The Keccak core unit may be further adjusted and improved. The newly designed Keccak core contains additional register to hold the state in the permutation block. The 1-bit hold signal is to control the hold state, so the permutation process can be paused to wait for the end of the sampling process. The input padder accepts 64 bits input data every cycle and gets 1344 bits with padding after 17 or 21 cycles. The valid output bits of input padder are 1088 or 1344, depending on the 2-bit shake_mode signal. The final output is obtained through repeated permutation and all the process cost 48 cycles. The valid final output bits are 1088 or 1344, depending on the 2-bit shake_mode signal. The intermediate 1600-bit data XOR with 1344-bit from input padder, until all the input bits are absorbed. The 1-bit last signal indicates the last input and the 3-bit byte signal is the valid input bytes. The final 1344-bit can go back into new round of permutation with 48 cycles until no more output bits are required. The 1-bit squeeze signal is to control the continued generation of the output bits.

Preferably, the sampling unit may include four computing stages, where each stage consumes one hardware cycle. An FSM is designed to indicate the computing state of Keccak core unit in FIG. 6C. If the Keccak core unit produce a valid output, the state will go to the output_state. In the output_state, when the 1-bit output ready signal is high, the 1344-bit output from Keccak core unit is saved and the sampling process starts. In stage 1, the number selection block selects the bits of the sampled number and an address counter is used to generate the number address. There are two 23-bit output number from the samplers. The valid bit for each sampler is 4 bits in rej_eta sampling and 23 bits in rej_uniform sampling. Only the outputs of the SHAKE128 need to be sampled, while for the SHAKE256 output, the 64-bit number is sent to the output FIFO directly. In stage 2, two combined samplers are used for sampling. One 23-bit temporary number is the previously saved sampled numbers while the other two 23-bit numbers are the current sampled number. In stage 3, two 23-bit numbers will be selected to output if these numbers meet the requirements. In stage 4, the post transform computation is performed for the two selected numbers in rej_eta sampling. Since the two samplers accept two 4-bit numbers in one cycle during rej_eta sampling process, they need at least 168 cycles to complete the sampling, which is far more than 48 cycles in permutation. Therefore, in rej_eta sampling, the output cycles may be extended to wait for the completion of the sampling process. This is because if the bit width of the sampler unit is enlarged, the used logic resources would be increased significantly. As long as the size of the short vector that needs to be sampled is relatively small, the extension of clock cycle is a better trade-off.

In order to analyze the performance of these modules, namely NTT, PWM, PWA, and SHAKE modules, each of these modules is tested individually. Note that during the individual module test, the 64-bit width input and output FIFOs are also included and configured as read and write interfaces. The target platform is the Xilinx ZedBoard, which is based on the Xilinx Zynq-7000 XC7Z020-1 device. The implementation results in terms of hardware resources are shown in the table below:

| HW Module | LUT | Slice | FF | DSP | BRAM | Fmax (MHz) |
| --- | --- | --- | --- | --- | --- | --- |
| NTT/INTT | 799 | 328 | 971 | 2 | 4.5 | 172 |
| PWM | 561 | 257 | 796 | 4 | 3 | 178 |
| PWA | 527 | 209 | 645 | 0 | 4 | 238 |
| SHAKE | 8472 | 2411 | 5035 | 0 | 2 | 169 |
| HW_ACC_IP | 9365 | 2826 | 6811 | 4 | 5 | 161 |
| PL_HW_system | 13128 (24%) | 4379 (32%) | 11556 (10%) | 4 (1.8%) | 14 (10%) | 150 | while the cycles count for different parameter settings are shown in the table as follows:

| HW Module | Function | HW cycles |
| --- | --- | --- |
| NTT/INTT | ntt (n = 256) | 1405 |
|  | intt (n = 256) | 1405 |
| PWM | point_wise_mul (k = 1) | 269 |
|  | point_wise_mul (k = 6) | 911 |

-continued

| HW Module | Function | HW cycles |
|---|---|---|
| PWA | point_wise_add (l = 2) | 265 |
| | point_wise_sub (l = 2) | 265 |
| | point_wise_add (l = 5) | 665 |
| SHAKE | $H_{256}$ (32, 96) | 81 |
| | $H_{256}$ (1952, 48) | 761 |
| | $H_{128}$ + rej_uniform (n = 256) | 284 |
| | $H_{128}$ + rej_eta_4 (n = 256) | 302 |
| | $H_{128}$ + rej_eta_2 (n = 256) | 214 |

The Hybrid NTT/INTT module performs 102A both the NTT and INTT that have the same polynomial length n and modulus q in Dilithium. The module contains only one butterfly unit, which consumes two DSPs. The cycle counts of length n NTT/INTT mainly includes n/2×2 cycles for FIFOs reading and writing, n/2×$\log_2$ n cycles for NTT calculation and 15×$\log_2$ n cycles for pipeline delay in different NTT stages. The hybrid structure uses the same computing cycles for both NTT and INTT computation, which is 1405 cycles in Dilithium of n=256 and q=8380417. The critical path in this module lies in the modular reduction unit.

The PWM module 102B realizes point-wise multiplication of two polynomials. By configuring the parameters, it could also multiply a variable-length polynomial-vector by a polynomial. There are two modular multiplication units in the PWM module to match the transmission speed of input and output FIFOs. The PWM module needs n/2 cycles to read the first polynomial. The reading time of the later polynomials is buried into the pipeline computation. There are n/2×k cycles for point-wise multiplication and 8 cycles for modular multiplication in the pipeline. When the polynomial vector length k under test is set to 6 (i.e. the length of NIST security level 3), the cycle cost is 911.

The PWA module 102C computes point-wise addition and subtraction of two polynomials. The negation of the numbers for subtraction is hidden in the pipeline. The PWA module can also be configured to compute the pointwise addition of polynomial vectors. The modular addition unit number is set to two to match the data transmission speed of FIFOs. The computing time mainly includes n/2 cycles for data reading of the first polynomials and n/2×(l−1) cycles of point-wise addition. The vector length is parameter configurable. When set the tested length l=5 (i.e. the length of NIST security level 3), the cycle cost is 665.

The SHAKE module 102D generates the outputs of the SHAKE256 and the sampled results of the SHAKE128. This module consumes the highest portion of hardware resources in this design because a relatively high-speed Keccak core would not become the performance bottleneck of the whole system. The first tested SHAKE256 function works as a PRNG, which requires 32-byte inputs and obtains 96-byte outputs. The second tested SHAKE256 function works as a collision resistant hash (CRH) function, which requires 1952-bytes inputs and obtains 48 bytes outputs. For the other three SHAKE128 related functions, the inputs are 34 bytes, and the outputs are polynomials with length 256. All three functions complete the sampling process in the interval between two rounds of Keccak output (each round consumes 48 cycles for permutation). In rej_uniform sampling, at least five rounds of Keccak permutations are required since two samplers receive 48 bits each cycle, and the sampling acceptance rate is 99%. In rej_eta sampling, two samplers require 8 bits each cycle. For each round 1344-bit output, it consumes 168 cycles for sampling, which is more than 48 cycles. Therefore, the hold signal is pulled high to extend two round interval cycles from 48 to 168 in order to wait for the end of the sampling process.

To evaluate the performance of the hybrid software/hardware processor, an example system was integrated and implemented on the Xilinx ZedBoard with the Zynq-7020 device inside. Apart from the reconfigurable logic, ZedBoard has an on-chip ARM Cortex-A9 processor running at 667 MHz with a 512 MB DDR memory. Four hardware modules were integrated into the reconfigurable logic and the software is run on the ARM processor. In this design, Vivado 2020.2 is used for the synthesis and implementation while the whole software/hardware system is evaluated using Vitis 2020.2. The hardware resource usage after place and route are shown in Table 5. The HW_ACC_IP is the integration of the four modules while the PL_HW_system integrates all hardware modules on the PL, including the HW_ACC_IP, AXI-DMA, AXI interconnection, system clock, and the concat module. The maximum working frequency of the PL_HW_system reaches 150 MHz, which is lower than the individual modules. This is because of the logic congestion during place and route introduces longer wiring paths.

Note that the integrated HW_ACC_IP uses approximately 6.7% less LUT than the sum of the individual modules. This is because hardware resource reuse technique is applied during the system integration. To be more specific, the modular reduction units are shared between the hybrid NTT/INTT module and the PWM module, thus 4 DSPs instead of 6 are used in the HW_ACC_IP. The BRAMs used by the hybrid NTT/INTT, PWM, and PWA modules are also shared thus only 6.5 BRAMs are deployed in the HW_ACC_IP.

The performance evaluation of the individual functions in Dilithium is analyzed in this section by using the software/hardware system in accordance with the embodiment architecture of FIG. 1. The evaluation is conducted by comparing the computing time between the pure software and software/hardware co-design. In terms of the pure software implementation, the ARM Cortex-A9 processor is used by turning the processor's cache on and off. This is because in the Internet of Things (IoT) application scenarios, the energy efficient processors might not have cache support. In order to shed light on applications in different types of embedded devices, the acceleration results were tested when the cache is turned on and turned off and the results are as shown in the following Table.

| | Processor cache turn on | | | Processor cache turn off | | |
|---|---|---|---|---|---|---|
| Function | SW time(µs) | SW/HW time(µs) | Speedup | SW time(µs) | SW/HW time(us) | Speedup |
| ntt (n = 256) | 177 | 15.6 | 11.4 | 2223 | 14.2 | 155.9 |
| intt (n = 256) | 227 | 15.6 | 14.5 | 3096 | 14.3 | 216.9 |
| point_wise_mul (k = 1) | 50.8 | 12.7 | 4.0 | 725 | 11.2 | 64.6 |

-continued

| Function | Processor cache turn on | | | Processor cache turn off | | |
|---|---|---|---|---|---|---|
| | SW time(μs) | SW/HW time(μs) | Speedup | SW time(μs) | SW/HW time(us) | Speedup |
| point_wise_mul (k = 6) | 306 | 36.9 | 8.3 | 4336 | 16.6 | 261.0 |
| point_wise_add (l = 2) | 24.8 | 12.6 | 2.0 | 455 | 11.0 | 41.3 |
| point_wise_sub (l = 2) | 24.8 | 12.6 | 2.0 | 455 | 11.1 | 41.1 |
| point_wise_add (l = 5) | 51.6 | 16.6 | 3.1 | 988 | 11.7 | 84.7 |
| matrix_mul (k = 6, l = 5) | 1202 | 299 | 4.0 | 17830 | 281 | 63.3 |
| $H_{256}$ (32, 96) | 63.4 | 4.0 | 15.5 | 1004 | 6.3 | 158.6 |
| $H_{256}$ (1952, 48) | 954 | 9.9 | 96.1 | 14819 | 9.5 | 1558 |
| $H_{128}$ + rej_uniform (n = 256) | 341 | 11.5 | 29.7 | 5477 | 11.9 | 461.3 |
| $H_{128}$ + rej_eta_4 (n = 256) | 146 | 11.6 | 12.5 | 2330 | 11.9 | 195.2 |
| $H_{128}$ + rej_eta_2 (n = 256) | 81.1 | 11.0 | 7.4 | 1289 | 11.2 | 114.8 |

The SW time is the pure software function latency while SW/HW time includes latency of function call, parameter configuration, DMA preparation, and pure hardware execution time. When the cache is turned on, the data in DDR needs to be flushed into the cache. Otherwise, it will cause an inconsistent problem. Due to the time difference of the software execution, all the time indices are the average of 1000 measurements. The speedup is the ratio of the SW time to SW/HW time, which indicates the improvement of the software/hardware acceleration over the pure software.

In addition, the pure software with cache turn on has around 12-18 times speedup when compared with the cache turn off time. However, the performance improvement of cache is not significant when compared on the SW/HW time. This is because the cache could significantly accelerate the software operation but has almost no effect on the hardware operation, and the portion of software operation in the software/hardware co-design system is very low. When the cache is on, data flush functions are required, so this factor increases the SW/HW time. For example, the tested function point_wise_mul (k=6) consumes significantly more time when the cache is on, due to the long data flush time. On the other hand, DMA preparation time is shorter if the cache is on, which is the factor to decrease the total execution time. This helps to explain why the time of the $H_{256}$(32, 96) function is shorter when the cache is on.

Advantageously, the software/hardware system has 2-96 times speedup compared with the pure software implementation. The SW/HW acceleration of point_wise_mul and point_wise_add function increase with the parameter k and l respectively, because vectorized method is applied to reduce the data transmission amounts. The matrix_mul (k=6, l=5) is calculated by first using point_wise_mul (k=6) five times to obtain an intermediate matrix and then using point_wise_add (l=5) six times to obtain the final output, as shown in the two steps of FIG. 3. The matrix sampling is adjusted to be sampled by column so that the transfer address is continuous when the PWM is calculated, thereby reducing the number of DMA transfers. Thanks to the high-performance architecture design of the SHAKE module, the $H_{256}$(1952, 48) function achieves a speedup of 96 when compared with the pure software time. This result demonstrates that the high-speed architecture design for the time-consuming functions gives a good trade-off.

After the system integration, the Dilithium signature algorithms on both pure software and hardware-software co-design were evaluated and compared. The transmission interface is configured according to the parameters of Dilithium. Moreover, the hardware accelerator is designed to be fully parameter configurable; there is no need to modify the hardware design and transmission interface to adapt different security levels. The Dilithium algorithms are tested 1000-times and the average running time is recorded in FIGS. 7A and 7B. The speedup of software-hardware co-design to pure software is calculated accordingly and illustrated in FIG. 8. In FIGS. 7 and 8, K refers to Key generation, S refers to Sign, V refers to Verify, and 2, 3, and 5 are the corresponding NIST security levels.

Referring to FIGS. 7A and 7B, for the same security level, the Key generation and Verify algorithms take similar computing time while the Sign algorithm consumes 3-5 more time. This is because during Sign process, the signature rejection would introduce re-computation of Sign, thus increasing the computing time. For different security levels, the computing time increases with the expansion of the corresponding parameters.

Considering the speedup in FIG. 8, Key generation algorithm has the highest acceleration, while the Sign algorithm has the lowest index. This is because the Sign algorithm needs to unpack the generated key and pack the generated signature. These operations have no parallel property thus their computation would be serial in the hardware. In order to alleviate the usage of hardware resources for other operations, the pack and unpack operations are calculated in the software. In summary, when the cache is turned on, the hardware-software co-design system could accelerate the Dilithium algorithms by 6-13 times, and when the cache is turned off, it could accelerate the algorithms by 11-34 times.

In accordance with an embodiment of the present invention, a software/hardware co-design of CRYSTAL-Dilithium of NIST round-3 parameter sets is provided. The table below makes a detailed comparison of Dilithium and other digital signature schemes on different embedded platforms.

Advantageously, HW/SW co-design has its unique advantages. Firstly, since SW/HW co-design only focuses on hardware designs of the computationally intensive parts, thereby reducing the system development time. Secondly, SW/HW co-design can effectively reduce hardware resources usage by realizing module reuse, so as to leave room for the system to apply more functions and algorithms. Otherwise, the deployment of a single algorithm may occupy the resources in the entire board. Thirdly, SW/HW co-design has a higher flexibility. The deployment of algorithms in practical use may be different from the original algorithms when considering different application scenarios. The pure hardware implementation is difficult to further modify to satisfy different applications. But in a SW/HW co-design, the software in processor can be easily upgraded and flexibly adjust the parameters in hardware, which can help algorithms to better integrate into different scenarios. In addition, high-speed data transfer and computation architecture are used to increase the overall algorithms speed.

The hybrid software/hardware co-design may be useful in the NIST PQC round-3 digital signature scheme in CRYSTALS-Dilithium cryptosystems. In order to target high speed, hardware modules include hybrid NTT/INTT, point-wise multiplier and adder, SHAKE PRNG with tightly coupled samplers are included in the hybrid hardware/software architecture. To achieve flexibility, the ARM processor is cooperated with the aforementioned hardware accelerator to compute Dilithium for different security levels. The hardware is fully pipelined and parameterized thus could perform different calculations according to the configured parameters.

The inventors implemented the hybrid hardware/software processor on Xilinx ZedBoard and evaluate the Dilithium Key generation, Sign, and Verify algorithms performance under three different security levels. Implementation results show that the system could compute Dilithium security level 2 Key generation, Sign, and Verify in 1.10 ms, 5.93 ms, and 1.17 ms, respectively. Compared with the pure software implementation, the software/hardware co-design achieves a speedup of 6.3-33.2 times.

Advantageously, the hybrid processor consumes a reasonable amount of hardware resources and obtains high acceleration results, and it is observed that software/hardware co-design achieves a good balance in speed, resources, and flexibility compared with existing pure software and hardware designs. A summary of the present invention is provided as follows:

In pursuit of configurability, a flexible SoC architecture is designed for both software and hardware computation. A fully parameterized versatile design of hardware accelerator enables a run-time configuration to adjust the computation for Dilithium of different security levels.

In order to maintain a good speed-area trade-off, a hybrid NTT/INTT module is design for both NTT and INTT. The separated NTT and INTT algorithms are combined and the hybrid architecture is able to reused hardware resources for NTT/INTT computation. Moreover, hardware accelerators for the time-consuming SHAKE and point-wise addition/multiplication are designed to speed up the whole Dilithium system. The SHAKE module supports high speed SHA-3 related PRNG functions and sampling functions.

In order to reduce the data transmission overhead, vectorized point-wise adder and multiplier are designed to accommodate different lengths polynomial matrix-vector multiplication and polynomial vector multiplication/addition/subtraction. This design effectively reduces the data transfer between the software and the hardware. Furthermore, a unified pipeline architecture, which tightly integrated Keccak core with samplers, is designed for the SHAKE. The tightly coupled architecture can effectively reduce the intermediate data transmission between the software and the hardware.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A processor for a cryptosystem, comprising:
   a hybrid processor architecture including a hardware processor, a software processor and an interconnection interface arranged to exchange data between the hardware processor and the software processor;
   wherein the interconnection interface comprises a high-performance interface arranged to facilitate exchanges of computational data between the hardware processor and the software processor and a general-purpose low performance interface arranged to facilitate exchanges hardware-processor-operation control data between the hardware processor and the software processor;
   wherein the hardware processor comprises a plurality of hardware accelerator modules;
   wherein the hardware accelerator modules comprise:
      a number theoretic transforms (NTT) transformation module arranged to accelerate multiplications of two polynomials; and
      a point-wise computation module arranged to accelerate polynomial matrix-vector computations;
   wherein the multiplications of two polynomials and the polynomial matrix-vector computations require lesser computational time when executed by the hardware processor with accelerations from the hardware accelerator modules than by the software processor;
   wherein the hardware processor is implemented by a field programmable gate array (FPGA) or an application specific integrated circuit (ASIC); and
   wherein the software processor is implemented by one or more of x86 and x64 machine instruction sets executed by one or more of processors having a x86 architecture and processors having a x64 architecture.

2. The processor of claim 1, wherein the high-performance interface is an AXI memory interconnect and the general-purpose low performance interface is an AXI lite peripheral interconnect.

3. The processor of claim 2, wherein the AXI memory interconnect is arranged to read and write computation data via a data memory controller of the software processor, and to exchange the computation data with the plurality of hardware accelerator modules of the hardware processor through an AXI protocol.

4. The processor of claim 3, wherein the hardware processor further comprises a DMA intermedium arranged to facilitate exchanging the computation data between the AXI memory interconnect and the plurality of hardware accelerator modules through the AXI protocol.

5. The processor of claim 4, wherein the software processor is arranged to control transfer of computation data and passes configured parameters of the hardware processor through an AXI lite protocol via the AXI peripheral interconnect.

6. The processor of claim 5, wherein the AXI lite peripheral interconnect is arranged to read and write a plurality of control registers associated with the plurality of hardware accelerator modules in the hardware processor through the AXI-Lite protocol.

7. The processor of claim 1, wherein the NTT transformation module is a hybrid NTT/Inverse-NTT (INTT) transformation module configurable to operate in a selected one of an NTT mode or an INTT mode.

8. The processor of claim 7, wherein the NTT transformation module is arranged to operate according to an NTT finite state transition with following states:
   receiving two polynomials from an input FIFO of the hardware processor to a first RAM unit in the NTT transformation module in a read state;
   feeding the two polynomials stored in the first RAM unit into a butterfly unit, and storing computation results obtained by the butterfly unit in a second RAM unit in the NTT transformation module in a calculation state;
   writing the computation results to the output FIFO of the hardware processor in a write state; and
   returning the NTT transformation module in an idle state.

9. The processor of claim 8, wherein the NTT transformation module is arranged to resize the input data, the output data and/or the computation results with different bit lengths.

10. The processor of claim 1, wherein the point-wise computation module is arranged to accelerate point-wise multiplications of two polynomials.

11. The processor of claim 10, wherein the point-wise computation module is arranged to operate according to a point-wise multiplication finite state transition with following states:
   receiving two polynomials from an input FIFO of the hardware processor to RAM in two multipliers in the point-wise-computation module in a read state;
   completing the point-wise multiplication and modular reduction operations, then writing computation results to the output FIFO of the hardware processor in a multiplication-writing-state; and
   after carrying out reading, computing, and writing computation data in a pipelined manner, returning the point-wise multiplication module in an idle state.

12. The processor of claim 1, wherein the point-wise computation module is arranged to accelerate point-wise additions and subtractions of two polynomials.

13. The processor of claim 12, wherein the point-wise computation module is arranged to operate according to a point-wise addition finite state transition with following states:
   receiving at least two polynomials from an input FIFO of the hardware processor to RAM in two adders in the point-wise-computation module in a read state;
   completing point-wise addition, then writing computation results to the output FIFO of the hardware processor in an addition-writing-state; and
   after carrying out reading, computing, and writing computation data in a pipelined manner, returning the point-wise addition module in an idle state;
   wherein in the addition-writing-state, the point-wise addition module is arranged to perform subtraction by adding a negative representation of one of the two polynomials to another one.

14. The processor of claim 13, wherein the point-wise addition finite state transition further includes an addition state in which more than two sets of polynomials are added by performing point-wise addition before the point-wise addition module entering the addition-writing-state.

15. The processor of claim 1, wherein the plurality of hardware accelerator modules includes a hash module arranged to perform a plurality of operations related to hashing of computation results.

16. The processor of claim 15, wherein the hash module is a SHAKE module arranged to perform SHA-3 related PRNG functions and sampling functions.

17. The processor of claim 1, wherein the cryptosystem is a Dilithium-based cryptosystem.

* * * * *